(12) United States Patent
Fujiwara et al.

(10) Patent No.: US 9,760,101 B2
(45) Date of Patent: Sep. 12, 2017

(54) SWITCHING REGULATOR CONTROL CIRCUIT

(71) Applicant: Renesas Electronics Corporation, Kanagawa (JP)

(72) Inventors: Hirofumi Fujiwara, Kanagawa (JP); Hirokazu Kawagoshi, Kanagawa (JP); Yasuhiro Kosaka, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 549 days.

(21) Appl. No.: 13/919,201

(22) Filed: Jun. 17, 2013

(65) Prior Publication Data

US 2013/0335050 A1 Dec. 19, 2013

(30) Foreign Application Priority Data

Jun. 19, 2012 (JP) ................ 2012-137477

(51) Int. Cl.
| | |
|---|---|
| *G05F 1/10* | (2006.01) |
| *H02M 1/08* | (2006.01) |
| *H02M 3/158* | (2006.01) |
| *H02M 1/00* | (2006.01) |

(52) U.S. Cl.
CPC ............ *G05F 1/10* (2013.01); *H02M 1/08* (2013.01); *H02M 3/1584* (2013.01); *H02M 3/1588* (2013.01); *H02M 2001/0025* (2013.01); *H02M 2001/0032* (2013.01); *Y02B 70/1466* (2013.01); *Y02B 70/16* (2013.01)

(58) Field of Classification Search
CPC ......... G05F 1/10; H02M 1/08; H02M 3/1588; H02M 3/1584
See application file for complete search history.

(56) References Cited

U.S. PATENT DOCUMENTS

| | | | |
|---|---|---|---|
| 6,100,675 A | 8/2000 | Sudo | |
| 6,281,668 B1 | 8/2001 | Sudo | |
| 7,301,400 B1 * | 11/2007 | Dening | ............... H03F 1/0227 323/272 |
| 7,804,285 B2 | 9/2010 | Nishida | |

(Continued)

FOREIGN PATENT DOCUMENTS

| | | |
|---|---|---|
| JP | 11-155281 A | 6/1999 |
| JP | 11-235023 A | 8/1999 |

(Continued)

OTHER PUBLICATIONS

Communication dated Dec. 8, 2015 from the Japanese Patent Office issued in corresponding Application No. 2012-137477.

*Primary Examiner* — Jue Zhang
(74) *Attorney, Agent, or Firm* — Sughrue Mion, PLLC

(57) ABSTRACT

In the related art, there is a problem that the condition of a load is monitored in an indirect manner so that an efficiency enhancing effect is not obtained. A switching regulator control circuit includes an oscillator for generating a carrier signal and a transistor drive circuit for driving a switching transistor and a synchronous rectification transistor based on a PWM signal generated based on the carrier signal. The oscillator switches the frequency of the carrier signal based on the direction of a source-drain voltage of the synchronous rectification transistor.

14 Claims, 10 Drawing Sheets

(56) References Cited

U.S. PATENT DOCUMENTS

| | | | |
|---|---|---|---|
| 2006/0113974 A1* | 6/2006 | Kan | H02M 3/156 323/282 |
| 2008/0094861 A1 | 4/2008 | Wang | |
| 2010/0148737 A1* | 6/2010 | Li | H02M 3/1588 323/282 |

FOREIGN PATENT DOCUMENTS

| | | |
|---|---|---|
| JP | 2002281743 A | 9/2002 |
| JP | 2006-166667 A | 6/2006 |
| JP | 2007202281 A | 8/2007 |
| JP | 2007-236051 A | 9/2007 |
| JP | 200872786 A | 3/2008 |
| JP | 2008-109761 A | 5/2008 |
| JP | 2011-024345 A | 2/2011 |

* cited by examiner

SWITCHING REGULATOR CONTROL CIRCUIT

CROSS-REFERENCE TO RELATED APPLICATIONS

The disclosure of Japanese Patent Application No. 2012-137477 filed on Jun. 19, 2012 including the specification, drawings and abstract is incorporated herein by reference in its entirety.

BACKGROUND

The present invention relates to a switching regulator control circuit and a switching regulator control method, and is suitably applicable, for example, to a PWM (Pulse Width Modulation) switching regulator that automatically switches a carrier frequency in accordance with the condition of a load.

In recent years, household and industrial electronic devices have microcontrollers. A power supply system including a DC-DC (Direct Current to Direct Current) converter is widely used as a stabilized DC power supply for driving such a microcontroller. A switching regulator is mainly used as the DC-DC converter. The switching regulator includes an output power transistor and a switching regulator control circuit for controlling the on/off operation of the output power transistor. The switching regulator control circuit is mounted on a power supply IC (Integrated Circuit). The power supply system for the microcontroller is required to have high efficiency both during standby and during operation of the microcontroller. At light load such as during standby, power consumed by the switching regulator control circuit becomes larger than power consumed by the load such as the microcontroller, which reduces the efficiency of the power supply system. Therefore, it is particularly important to enhance the efficiency at light load. Among element circuits in the switching regulator control circuit, an internal oscillator and a transistor drive circuit mainly consume power. The internal oscillator generates a carrier signal. The transistor drive circuit drives the output power transistor which operates at the same frequency as the carrier signal.

Typical switching regulator control circuits include a PWM switching regulator control circuit and a PFM (Pulse Frequency Modulation) switching regulator control circuit. Japanese Unexamined Patent Publication No. Hei 11 (1999)-155281 (Patent Document 1) discloses an example of the PWM switching regulator control circuit. Japanese Unexamined Patent Publication No. Hei 11 (1999)-235023 (Patent Document 2) discloses an example of the PFM switching regulator control circuit.

The operating conditions of the switching regulator include a continuous current mode and a discontinuous current mode. The discontinuous current mode is occasionally referred to as an intermittent current mode. According to Japanese Unexamined Patent Publication No. 2006-166667 (Patent Document 3), when a synchronous rectification switching regulator goes into the discontinuous current mode in a light load condition such as standby condition or sleep mode, the efficiency decreases significantly. For this reason, Patent Document 3 discloses a switching regulator that can switch between synchronous rectification and diode rectification. In the switching regulator, an error voltage obtained by amplifying a difference between a voltage obtained by dividing an output voltage of the switching regulator and a first reference voltage is outputted, a drive pulse of the switching regulator is generated based on the error voltage, and synchronous rectification is switched to diode rectification based on a comparison between the error voltage and a second reference voltage.

According to Japanese Unexamined Patent Publication No. 2008-109761 (Patent Document 4), there is known a method for determining whether the DC-DC converter is operating in continuous current mode or discontinuous current mode to determine the magnitude of the load. The method for determining the continuous current mode or discontinuous current mode based on the voltage drop of a resistor placed in series with an inductor in the DC-DC converter causes loss due to a current flowing through the resistor and therefore reduces the power conversion efficiency of the DC-DC converter. For this reason, Patent Document 4 discloses an operation mode determination unit capable of accurately determining the operation mode of the DC-DC converter with a simple circuit configuration without reducing the power conversion efficiency of the DC-DC converter. The operation mode determination unit determines whether the DC-DC converter is operating in continuous current mode or discontinuous current mode based on the detection result of an output terminal voltage of a switching element during the off time of the switching element in the DC-DC converter. The DC-DC converter outputs a DC voltage by controlling the charging/discharging of energy in an inductor and a capacitor by the on/off operation of the switching element. In the case of a step-down DC-DC converter, the switching element is a P-channel field-effect transistor. One terminal of the inductor is coupled through the P-channel field-effect transistor to an output terminal of an input voltage, and coupled to a cathode of a diode. The other terminal of the inductor is coupled through the capacitor to an anode of the diode. The operation mode determination unit makes the determination based on a gate potential and a drain potential of the P-channel transistor.

As a solution to the problem that the efficiency of the PWM switching regulator decreases at light load, Japanese Unexamined Patent Publication No. 2011-24345 (Patent Document 5) discloses a switching regulator that switching-drives the output power transistor in a PWM manner at heavy load and in a PFM manner at light load. However, since the operating frequency is unstable in the PFM manner, the switching regulator operating in the PFM manner might become a noise source to other circuits including the microcontroller.

As another solution to the problem that the efficiency of the PWM switching regulator decreases at light load, Patent Document 1 discloses a PWM switching regulator that includes an oscillation circuit whose oscillation frequency varies in accordance with the condition of the load. An error amplifier amplifies a difference voltage between a voltage obtained by dividing an output voltage of the switching regulator and a first reference voltage, and outputs the amplified voltage. The output of the error amplifier varies in accordance with a load current. The oscillation circuit outputs a triangular wave. A PWM comparator outputs a signal based on a comparison between the triangular wave and the output of the error amplifier. The on/off operation of a switch element in the switching regulator is performed based on the output signal of the PWM comparator. A comparator determines whether the output voltage of the error amplifier is higher or lower than a second reference voltage. The oscillation circuit varies the oscillation frequency in accordance with the determination result. When the load becomes light, that is, the load current value becomes small, the oscillation frequency of the oscillation circuit is lowered, thereby improving the efficiency at light load.

According to the invention disclosed in Patent Document 1, the oscillation frequency is varied based on the output of the error amplifier. Accordingly, the present inventors have found the following problems. First, there is a problem that the error amplifier has a slow response to a change in the condition of the load, which lengthens the time from a change in the condition of the load to a change in the oscillation frequency of the oscillation circuit. The reason is that as disclosed in Japanese Unexamined Patent Publication No. 2007-236051 (Patent Document 6), the transfer characteristic of the switching regulator has a time delay due to a rectification smoothing operation through a switching operation and an inductor, and to ensure the stability of control, the response speed of the control circuit cannot be increased. Second, there is a problem that an efficiency enhancing effect is not obtained as a result when the relationship between the load current and a duty ratio changes. The reason is that the output voltage of the error amplifier corresponds to the duty ratio, and whether the load is light or heavy is determined based on the output voltage of the error amplifier; therefore, the condition of the load is monitored in an indirect manner, and the second reference voltage as a determination reference value is determined based also on the indirect manner. Third, there is a problem that since the second reference voltage as the determination reference value needs to be determined at the time of circuit design, it is difficult to adjust the reference value after the switching regulator along with the microcontroller as the load is incorporated into the system. Accordingly, the efficiency enhancing effect might not be obtained as a result when the duty ratio which is a threshold value for distinguishing between light and heavy loads changes depending on manufacturing variations or use conditions.

SUMMARY

In the related art, there is a problem that the condition of the load is monitored in an indirect manner so that the efficiency enhancing effect is not obtained.

The other problems and novel features will become apparent from the description of this specification and the accompanying drawings.

A switching regulator control circuit according to one embodiment includes an oscillator for generating a carrier signal and a first transistor drive circuit for driving a first switching transistor and a first synchronous rectification transistor based on a first PWM signal generated based on the carrier signal. The oscillator switches a frequency of the carrier signal based on a direction of a source-drain voltage of the first synchronous rectification transistor.

A switching regulator control method according to another embodiment includes the steps of generating a first PWM signal based on a carrier signal, driving a first switching transistor and a first synchronous rectification transistor based on the first PWM signal, and switching a frequency of the carrier signal based on a direction of a source-drain voltage of the first synchronous rectification transistor.

According to the one embodiment, since the condition of a load is monitored in a direct manner, it is possible to stably enhance the efficiency of the switching regulator at light load.

DETAILED DESCRIPTION

Figure 1:
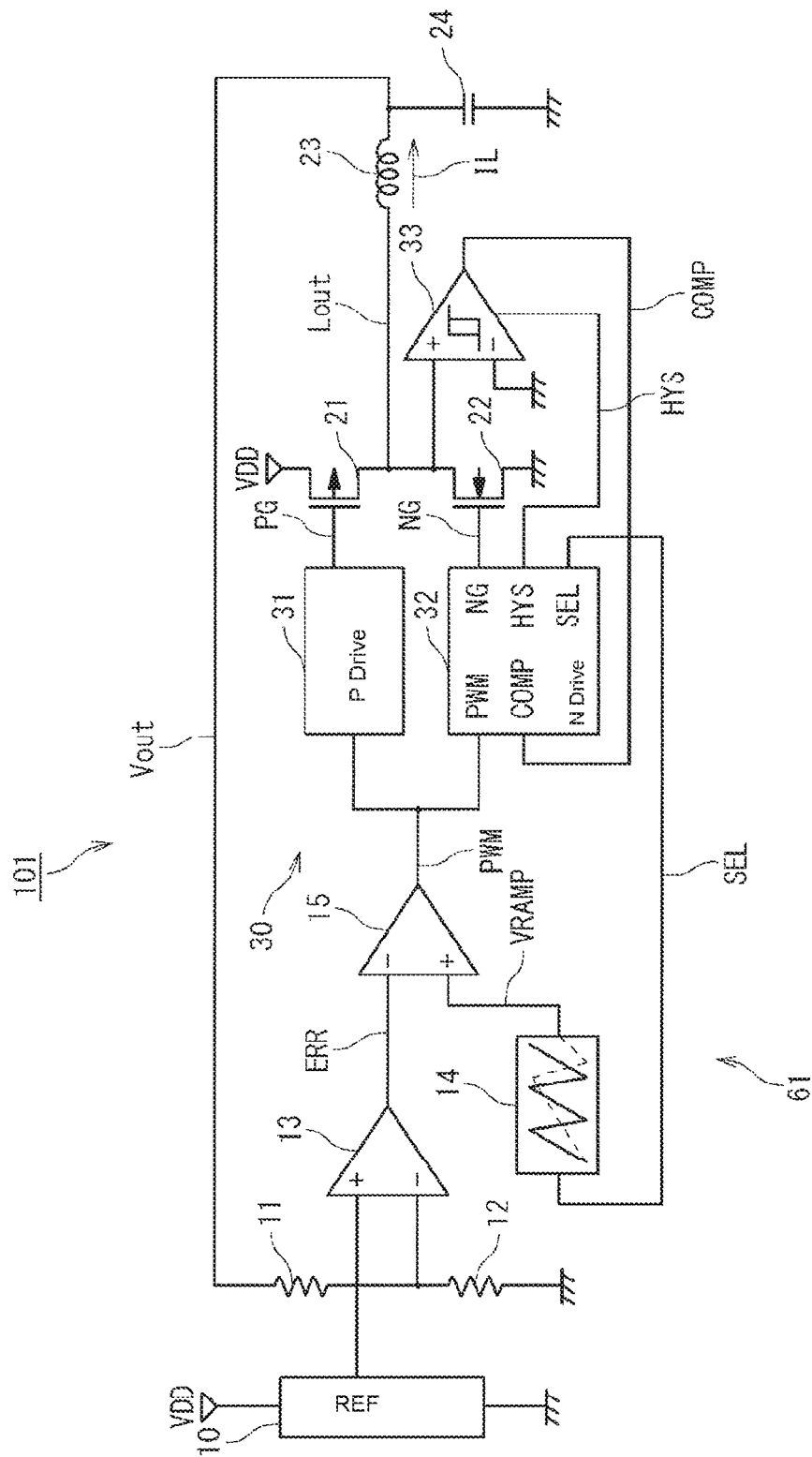
FIG. 1 is a circuit diagram of a step-down switching regulator according to a first embodiment.

Hereinafter, embodiments of a switching regulator control circuit and a switching regulator control method will be described with reference to the accompanying drawings.
First Embodiment A step-down switching regulator 101 according to the first embodiment will be described with reference to FIG. 1. The step-down switching regulator 101 is used to generate a relatively low output voltage (output potential Vout–ground potential) from a relatively high input voltage (power supply potential VDD–ground potential) and supply the output voltage to a load (not shown). The load is, for example, a microcontroller. The step-down switching regulator 101 includes a reference voltage circuit 10, voltage detection resistors 11 and 12, a switching regulator control circuit 61, a P-channel transistor 21, an N-channel transistor 22, an inductor 23, and a smoothing capacitor 24. The P-channel transistor 21 is occasionally referred to as a P-channel output power transistor. The N-channel transistor 22 is occasionally referred to as an N-channel output power transistor. The P-channel transistor 21 is, for example, a P-channel MOSFET (metal-oxide semiconductor field-effect transistor). The N-channel transistor 22 is, for example, an N-channel MOSFET. The inductor 23 is, for example, a coil. The switching regulator control circuit 61 includes an error amplifier 13, an oscillator 14, a PWM (Pulse Width Modulation) comparator 15, and a transistor drive circuit 30. The transistor drive circuit 30 includes a P-channel transistor drive circuit 31, an N-channel transistor drive circuit 32, and a hysteresis comparator 33. The oscillator 14 is occasionally referred to as an internal oscillator. The switching regulator control circuit 61 may be provided on a single power supply IC (Integrated Circuit) chip.

The P-channel transistor 21 is occasionally referred to as a switching transistor 21. The N-channel transistor 22 is occasionally referred to as a synchronous rectification transistor 22. The P-channel transistor drive circuit 31 is occasionally referred to as a switching transistor drive circuit 31. The N-channel transistor drive circuit 32 is occasionally referred to as a synchronous rectification transistor drive circuit 32.

A source of the P-channel transistor 21 is coupled to the power supply potential VDD. A drain of the P-channel transistor 21 is coupled to a drain of the N-channel transistor 22 and one terminal of the inductor 23. A potential at the one terminal of the inductor 23 is referred to as an inductor potential Lout. The inductor potential Lout, the drain potential of the P-channel transistor 21, and the drain potential of the N-channel transistor 22 are equal to each other. A source of the N-channel transistor 22 is coupled to the ground potential. The other terminal of the inductor 23 is coupled to the load, coupled through the smoothing capacitor 24 to the ground potential, and coupled through the voltage detection resistors 11 and 12 placed in series to the ground potential. A potential at the other terminal of the inductor 23 is equal to the output potential Vout. A current IL is a current flowing through the inductor 23. The direction of the current IL is positive (+) when the current IL flows from the one terminal to the other terminal of the inductor 23, that is, in the direction of an arrow in FIG. 1. The direction of the current IL is negative (−) when the current IL flows in the direction reverse to the arrow. The reference voltage circuit 10 is coupled to the power supply potential VDD and coupled to the ground potential. An output terminal of the reference voltage circuit 10 is coupled to a (+) input terminal of the error amplifier 13. A node between the voltage detection resistors 11 and 12 is coupled to a (−) input terminal of the error amplifier 13. An output terminal of the error amplifier 13 is coupled to a (−) input terminal of the PWM comparator 15. An output terminal of the oscillator 14 is coupled to a (+) input terminal of the PWM comparator 15. An output terminal of the PWM comparator 15 is coupled to an input terminal of the P-channel transistor drive circuit 31 and a PWM input terminal of the N-channel transistor drive circuit 32. An output terminal of the P-channel transistor drive circuit 31 is coupled to a gate of the P-channel transistor 21. An NG output terminal of the N-channel transistor drive circuit 32 is coupled to a gate of the N-channel transistor 22. An HYS output terminal of the N-channel transistor drive circuit 32 is coupled to a control signal input terminal of the hysteresis comparator 33. A SEL output terminal of the N-channel transistor drive circuit 32 is coupled to an input terminal of the oscillator 14. A (+) input terminal of the hysteresis comparator 33 is coupled to the drain of the N-channel transistor 22. A (−) input terminal of the hysteresis comparator 33 is coupled to the ground potential. That is, the (−) input terminal of the hysteresis comparator 33 is coupled to the source of the N-channel transistor 22. An output terminal of the hysteresis comparator 33 is coupled to a COMP input terminal of the N-channel transistor drive circuit 32.

The reference voltage circuit 10 outputs a reference potential based on the power supply potential VDD and the ground potential. The error amplifier 13 outputs an error signal ERR based on the reference potential and a potential at the node between the voltage detection resistors 11 and 12. In other words, the error amplifier 13 outputs the error signal ERR based on a reference voltage (reference potential−ground potential) and a voltage (potential at the node between the voltage detection resistors 11 and 12−ground potential) obtained by dividing the output voltage (output potential Vout−ground potential). The oscillator 14 generates a carrier signal VRAMP based on a frequency selection signal SEL outputted by the N-channel transistor drive circuit 32. The carrier signal VRAMP is a triangular signal or a sawtooth signal. The oscillator 14 switches the frequency of the carrier signal VRAMP based on the frequency selection signal SEL. The oscillator 14 sets the carrier signal to a low frequency when the frequency selection signal SEL is at an H (high) level, and sets the carrier signal to a high frequency when the frequency selection signal SEL is at an L (low) level. The oscillator 14 can change the frequency of the carrier signal in accordance with the method disclosed in Japanese Unexamined Patent Publication No. Hei 11 (1999)-155281 for example. The PWM comparator 15 generates a PWM signal PWM based on the error signal ERR and the carrier signal VRAMP.

The P-channel transistor drive circuit 31 drives the P-channel transistor 21 based on the PWM signal PWM. More specifically, the P-channel transistor drive circuit 31 controls a gate potential PG of the P-channel transistor 21 based on the PWM signal PWM, for the on/off operation of the P-channel transistor 21. The P-channel transistor 21 is turned off when the PWM signal PWM is at the H level, and turned on when the PWM signal PWM is at the L level. That is, the P-channel transistor 21 is turned off and on when the output terminal of the PWM comparator 15 from which the PWM signal PWM is outputted is at the H level and the L level, respectively. The N-channel transistor drive circuit 32 drives the N-channel transistor 22 based on the PWM signal PWM and a monitoring signal COMP outputted by the hysteresis comparator 33. More specifically, the N-channel transistor drive circuit 32 controls a gate potential NG of the N-channel transistor 22 based on the PWM signal PWM and the monitoring signal COMP, for the on/off operation of the N-channel transistor 22. The N-channel transistor 22 is turned on or off when the PWM signal PWM is at the H level, and turned off when the PWM signal PWM is at the L level. The reason why the N-channel transistor 22 may be turned off when the PWM signal PWM is at the H level is that the N-channel gate potential NG depends not only on the PWM signal PWM but also on the monitoring signal COMP. The N-channel transistor drive circuit 32 further outputs a control signal HYS and the frequency selection signal SEL based on the PWM signal PWM and the monitoring signal COMP. The hysteresis comparator 33 outputs the monitoring signal COMP based on the direction of the source-drain voltage of the N-channel transistor 22 and the control signal HYS. The monitoring signal COMP is a signal for monitoring whether the operating condition of the load is a heavy load condition or a light load condition. The heavy load condition is, for example, a condition during operation of the load. The light load condition is, for example, a condition during standby of the load. When the control signal HYS is at the L level, the monitoring signal COMP is fixed to the L level irrespective of the direction of the source-drain voltage of the N-channel transistor 22. When the control signal HYS is at the H level, the monitoring signal COMP is set to the H level or the L level based on the direction of the source-drain voltage of the N-channel transistor 22. That is, when the control signal input terminal is at the L level, the output terminal of the hysteresis comparator 33 is at the L level irrespective of potentials at the (+) input terminal and (−) input terminal of the hysteresis comparator 33. When the control signal input terminal is at the H level and a potential at the (+) input terminal of the hysteresis comparator 33 is higher than a potential at the (−)

input terminal, the output terminal of the hysteresis comparator 33 is at the H level. When the control signal input terminal is at the H level and the potential at the (+) input terminal of the hysteresis comparator 33 is lower than the potential at the (−) input terminal, the output terminal of the hysteresis comparator 33 is at the L level.

Figure 2:
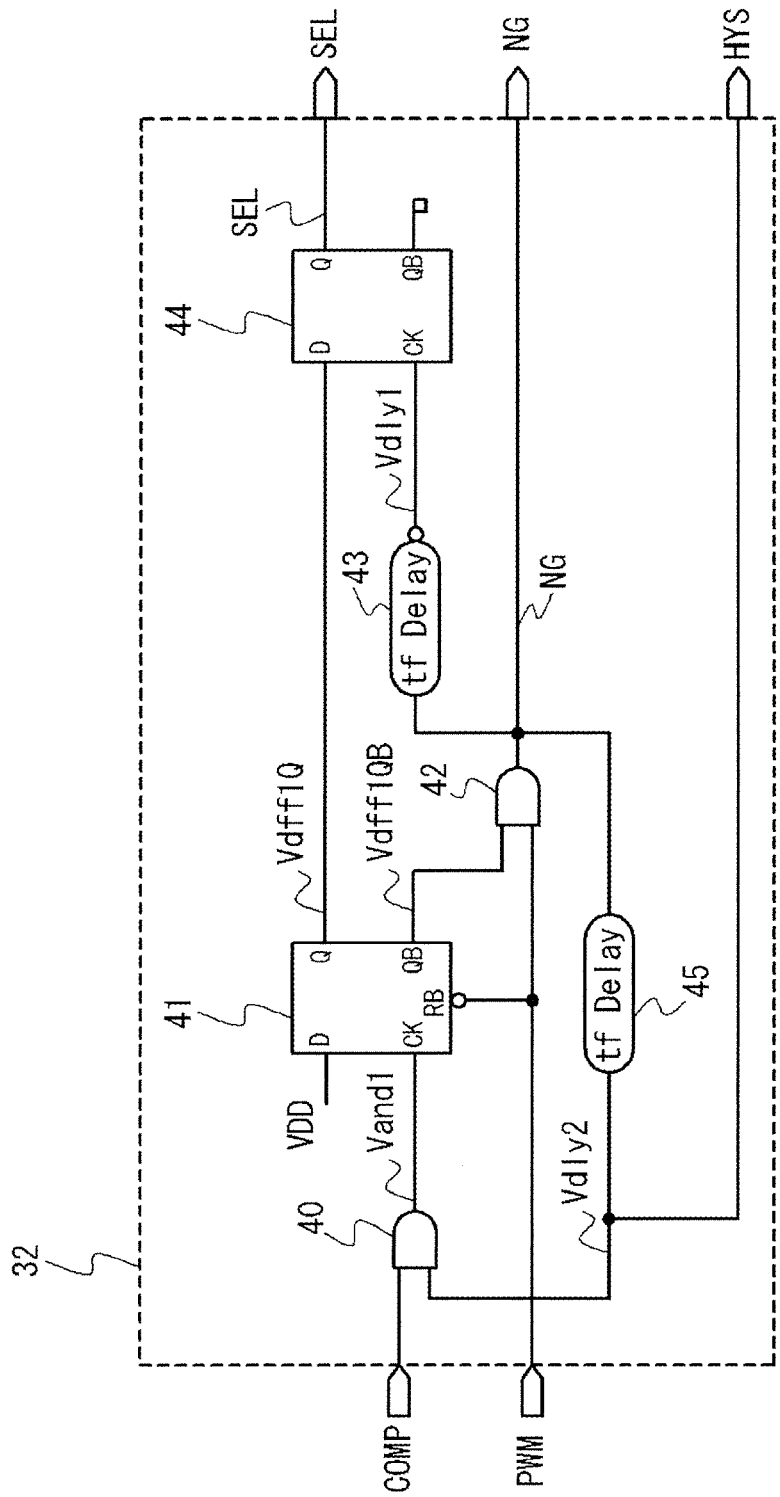
FIG. 2 is a circuit diagram of an N-channel transistor drive circuit in the step-down switching regulator according to the first embodiment.

The N-channel transistor drive circuit 32 will be described in detail with reference to FIG. 2. The N-channel transistor drive circuit 32 includes an AND circuit 40, a DFF (D flip-flop) 41, an AND circuit 42, a fall delay inverting circuit 43, a DFF 44, and a fall delay circuit 45. A first input terminal of the AND circuit 40 is coupled to the COMP input terminal of the N-channel transistor drive circuit 32. A second input terminal of the AND circuit 40 is coupled to an output terminal of the fall delay circuit 45. An output terminal of the AND circuit 40 is coupled to a CK (clock) input terminal of the DFF 41. A D input terminal of the DFF 41 is coupled to the power supply potential VDD. An RB (inversion reset) input terminal of the DFF 41 is coupled to the PWM input terminal of the N-channel transistor drive circuit 32. A Q output terminal of the DFF 41 is coupled to a D input terminal of the DFF 44. A QB output terminal of the DFF 41 is coupled to a first input terminal of the AND circuit 42. A second input terminal of the AND circuit 42 is coupled to the PWM input terminal of the N-channel transistor drive circuit 32. An output terminal of the AND circuit 42 is coupled to an input terminal of the fall delay inverting circuit 43, the NG output terminal of the N-channel transistor drive circuit 32, and an input terminal of the fall delay circuit 45. An output terminal of the fall delay inverting circuit 43 is coupled to a CK input terminal of the DFF 44. A Q output terminal of the DFF 44 is coupled to the SEL output terminal of the N-channel transistor drive circuit 32. A QB output terminal of the DFF 44 is coupled nowhere. The output terminal of the fall delay circuit 45 is coupled to the second input terminal of the AND circuit 40 and the HYS output terminal of the N-channel transistor drive circuit 32.

The AND circuit 40 outputs an AND signal Vand1 based on the monitoring signal COMP and a delayed signal Vdly2 outputted by the fall delay circuit 45. When both the monitoring signal COMP and the delayed signal Vdly2 are at the H level, the AND signal Vand1 is at the H level. Except when both the monitoring signal COMP and the delayed signal Vdly2 are at the H level, the AND signal Vand1 is at the L level.

The DFF 41 outputs a Q output signal Vdff1Q and a QB output signal Vdff1QB based on the power supply potential VDD, the AND signal Vand1, and the PWM signal PWM. Since the D input terminal of the DFF 41 is fixed to the H level by the power supply potential VDD; when the AND signal Vand1 rises from the L level to the H level, the Q output signal Vdff1Q in the next state is at the H level. When the AND signal Vand1 falls from the H level to the L level, the Q output signal Vdff1Q in the next state maintains the previous state. When the PWM signal falls from the H level to the L level, the Q output signal Vdff1Q is reset to the L level. The QB output signal Vdff1QB is an inverted signal of the Q output signal Vdff1Q.

The AND circuit 42 outputs the N-channel gate potential NG based on the QB output signal Vdff1QB and the PWM signal PWM. The N-channel gate potential NG is an AND signal of the QB output signal Vdff1QB and the PWM signal PWM. Therefore, when both the QB output signal Vdff1QB and the PWM signal PWM are at the H level, the N-channel gate potential NG is at the H level. Except when both the QB output signal Vdff1QB and the PWM signal PWM are at the H level, the N-channel gate potential NG is at the L level.

When the N-channel gate potential NG is at the H level, that is, the output terminal of the AND circuit 42 is at the H level, the N-channel transistor 22 is turned on. When the N-channel gate potential NG is at the L level, that is, the output terminal of the AND circuit 42 is at the L level, the N-channel transistor 22 is turned off.

The fall delay inverting circuit 43 outputs a delayed signal Vdly1 based on the N-channel gate potential NG. When the N-channel gate potential NG rises from the L level to the H level, the delayed signal Vdly1 falls from the H level to the L level without delay. When the N-channel gate potential NG falls from the H level to the L level, the delayed signal Vdly1 rises from the L level to the H level after a delay of a predetermined time.

The DFF 44 outputs a Q output the frequency selection signal SEL based on the Q output signal Vdff1Q and the delayed signal Vdly1. When the delayed signal Vdly1 rises from the L level to the H level when the Q output signal Vdff1Q is at the L level, the frequency selection signal SEL in the next state is at the L level. When the delayed signal Vdly1 rises from the L level to the H level when the Q output signal Vdff1Q is at the H level, the frequency selection signal SEL in the next state is at the H level. When the delayed signal Vdly1 falls from the H level to the L level, the frequency selection signal SEL in the next state maintains the previous state. The output terminal of the DFF 44 assumes the same level as the frequency selection signal SEL.

The fall delay circuit 45 outputs the delayed signal Vdly2 based on the N-channel gate potential NG. When the N-channel gate potential NG rises from the L level to the H level, the delayed signal Vdly2 rises from the L level to the H level without delay. When the N-channel gate potential NG falls from the H level to the L level, the delayed signal Vdly2 falls from the H level to the L level after a delay of the predetermined time. The delayed signal Vdly2 is outputted as the control signal HYS from the N-channel transistor drive circuit 32 to the hysteresis comparator 33.

Since the monitoring signal COMP is not directly inputted to the CK input terminal of the DFF 41, and the AND signal Vand1 outputted by the AND circuit 40 based on the monitoring signal COMP and the delayed signal Vdly2 is inputted to the CK input terminal of the DFF 41, the DFF 41 is prevented from malfunctioning due to the noise of the monitoring signal COMP.

In this embodiment, it is determined that the load is in the heavy load condition when the step-down switching regulator 101 is in a continuous current mode, and the load is in the light load condition when the step-down switching regulator 101 is in a discontinuous current mode.

The continuous current mode and the discontinuous current mode of the step-down switching regulator 101 will be described. In one period of the step-down switching regulator 101, energy is supplied to the inductor 23, and the energy is released from the inductor 23 to the smoothing capacitor 24. During the supply of energy to the inductor 23, the P-channel transistor 21 is turned on, and the N-channel transistor 22 is turned off. During the release of energy from the inductor 23 to the smoothing capacitor 24, the P-channel transistor 21 is turned off, and the N-channel transistor 22 is turned on. In the continuous current mode, the current IL always flows through the inductor 23 in the direction of the arrow in FIG. 1 during one period of the step-down switching regulator 101. This is because the next supply is started before the energy stored in the inductor 23 is completely released. In the discontinuous current mode, the direction of the current IL flowing through the inductor 23 changes from the direction of the arrow in FIG. 1 to the reverse direction in the duration of the release of energy from the inductor 23 in the state where the P-channel transistor 21 is turned off and the N-channel transistor 22 is turned on. This is because the energy stored in the inductor 23 is completely released. The current IL flowing in the direction reverse to the arrow in FIG. 1 passes through the smoothing capacitor 24, the inductor 23, the drain of the N-channel transistor 22, and the source of the N-channel transistor 22. The current IL in the reverse direction is occasionally referred to as a reverse current.

As for the relationship between the inductor potential Lout and the ground potential, the ground potential is always higher than the inductor potential Lout during the release of energy from the inductor 23 in the continuous current mode, whereas the ground potential becomes lower than the inductor potential Lout when the current IL becomes the reverse current during the release of energy from the inductor 23 in the discontinuous current mode. The hysteresis comparator 33 is provided to detect that the ground potential becomes lower than the inductor potential Lout, that is, the source potential of the N-channel transistor 22 becomes lower than the drain potential. Since the (+) input and (−) input of the hysteresis comparator 33 are coupled to the inductor potential Lout and the ground potential (drain and source of the N-channel transistor 22) respectively, the hysteresis comparator 33 outputs the monitoring signal COMP of the H level when the current IL becomes the reverse current.

The N-channel transistor drive circuit 32 outputs the frequency selection signal SEL based on the monitoring signal COMP, and the oscillator 14 switches the frequency of the carrier signal VRAMP based on the frequency selection signal SEL. Therefore, the oscillator 14 switches the frequency of the carrier signal VRAMP based on the direction of the source-drain voltage of the N-channel transistor 22. Therefore, in this embodiment, the operating condition of the load is monitored in a direct manner, and the determination of the operating condition of the load is less affected by manufacturing variations or use conditions. Therefore, it is possible to stably enhance the efficiency of the switching regulator at light load.

Hereinafter, the control method of the step-down switching regulator 101 will be described.

Figure 3:
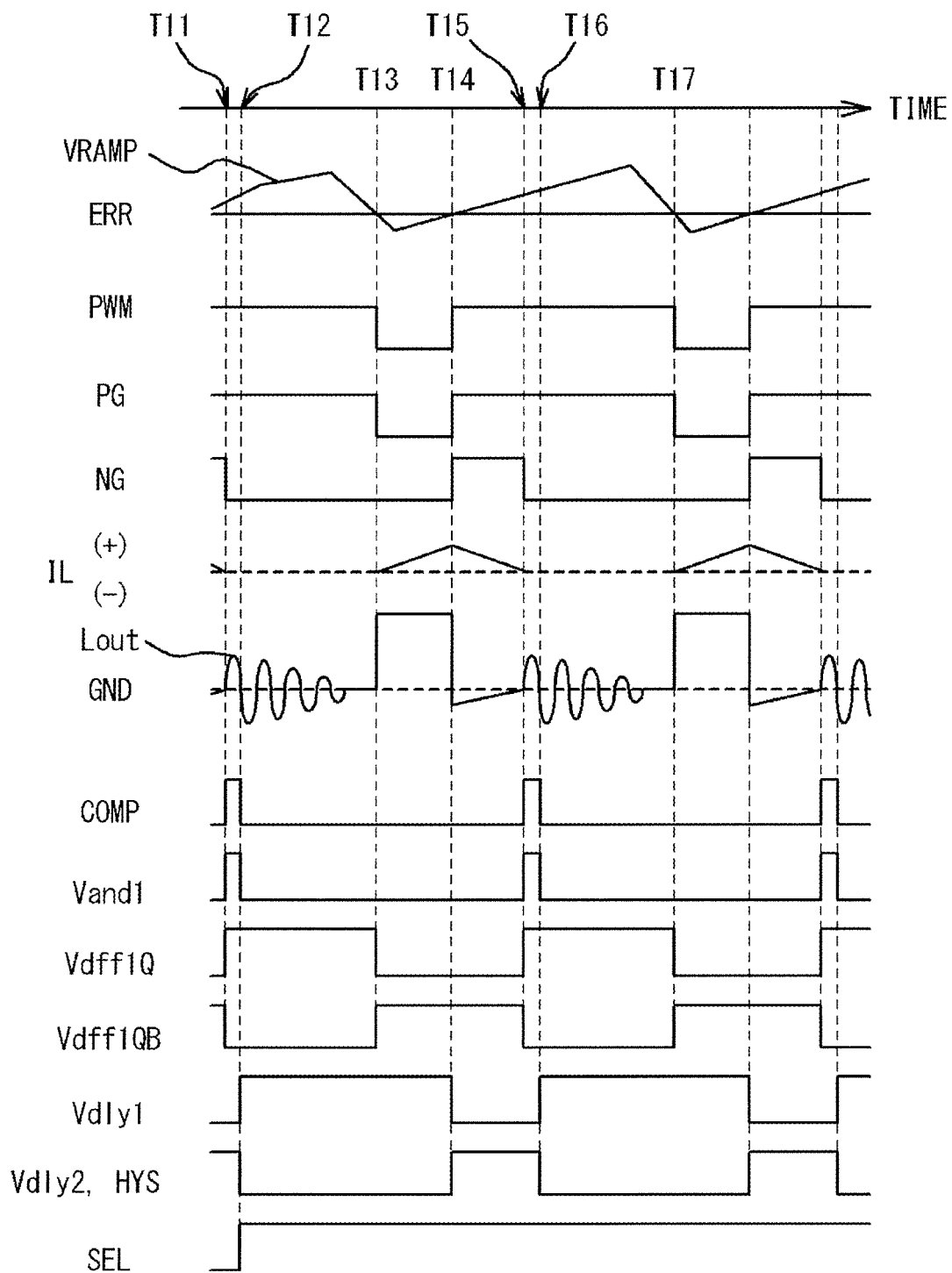
FIG. 3 is a timing chart showing operation waveforms of the step-down switching regulator according to the first embodiment when an operating condition has changed from a continuous current mode to a discontinuous current mode.

The control method when the operating condition of the step-down switching regulator 101 has changed from the continuous current mode to the discontinuous current mode will be described with reference to FIG. 3.

Before time T11, the operating condition of the step-down switching regulator 101 is the continuous current mode. The frequency selection signal SEL is at the L level. Therefore, the frequency of the carrier signal VRAMP is high. The potential of the carrier signal VRAMP is higher than the potential of the error signal ERR. The PWM signal PWM is at the H level. The P-channel gate potential PG is at the H level, and the P-channel transistor 21 is turned off. The N-channel gate potential NG is at the H level, and the N-channel transistor 22 is turned on. The direction of the current IL is the normal direction. The inductor potential Lout is lower than the ground potential. The monitoring signal COMP is at the L level. The AND signal Vand1 is at the L level. The Q output signal Vdff1Q is at the L level. The QB output signal Vdff1QB is at the H level. The delayed signal Vdly1 is at the L level. The delayed signal Vdly2 and the control signal HYS are at the H level.

At time T11, the hysteresis comparator 33 detects that the inductor potential Lout (drain potential of the N-channel transistor 22) becomes higher than the ground potential (source potential of the N-channel transistor 22), that is, detects the reverse current of the current IL, and changes the monitoring signal COMP from the L level to the H level. The AND signal Vand1 also rises from the L level to the H level, so that the Q output signal Vdff1Q changes from the L level to the H level, and the QB output signal Vdff1QB changes from the H level to the L level. Accordingly, the N-channel gate potential NG which is the logical product of the PWM signal PWM and the QB output signal Vdff1QB changes from the H level to the L level. Thereby, the N-channel transistor 22 is turned off, and the reverse current of the current IL is shut off. The shutoff of the reverse current prevents the reduction in the efficiency of the step-down switching regulator 101. Then, the inductor potential Lout starts to oscillate by resonance.

At time T12 after a lapse of a predetermined time from time T11, the delayed signal Vdly1 rises from the L level to the H level, and the delayed signal Vdly2 and the control signal HYS fall from the H level to the L level. That is, after a delay of the predetermined time from the falling edge of the N-channel gate potential NG, the delayed signal Vdly1 rises, and the delayed signal Vdly2 and the control signal HYS fall. Since the delayed signal Vdly1 rises when the Q output signal Vdff1Q is at the H level, the frequency selection signal SEL changes from the L level to the H level. Accordingly, the frequency of the carrier signal VRAMP becomes low. Since the control signal HYS becomes the L level, the monitoring signal COMP changes from the H level to the L level. The AND signal Vand1 which is the logical product of the monitoring signal COMP and the delayed signal Vdly2 also changes from the H level to the L level. At this time, the DFF 41 maintains the Q output signal Vdff1Q and the QB output signal Vdff1QB at the H level and the L level of the previous state, respectively.

At time T13, the carrier signal VRAMP changes from a higher potential than the error signal ERR to a lower potential, and the PWM signal PWM changes from the H level to the L level. Accordingly, the P-channel gate potential PG changes from the H level to the L level, which turns on the P-channel transistor 21. Consequently, the current IL flows through the inductor 23 in the normal direction, and the inductor potential Lout becomes higher than the ground potential. However, since the control signal HYS is at the L level, the monitoring signal COMP is maintained at the L level. Since the monitoring signal COMP is maintained at the L level, the AND signal Vand1 is also maintained at the L level. Further, since the PWM signal PWM changes from the H level to the L level, the DFF 41 is reset, so that the Q output signal Vdff1Q changes from the H level to the L level, and the QB output signal Vdff1QB changes from the L level to the H level. The N-channel gate potential NG which is the logical product of the PWM signal PWM and the QB output signal Vdff1QB is maintained at the L level, and the N-channel transistor 22 is maintained in the off state. Since the N-channel gate potential NG is maintained at the L level, the delayed signal Vdly1 is maintained at the H level, and the delayed signal Vdly2 and the control signal HYS are maintained at the L level.

At time T14, the carrier signal VRAMP changes from the lower potential than the error signal ERR to the higher potential, and the PWM signal PWM changes from the L level to the H level. Accordingly, the P-channel gate potential PG changes from the L level to the H level, which turns off the P-channel transistor 21. Since the PWM signal PWM changes from the L level to the H level, the N-channel gate potential NG which is the logical product of the PWM signal PWM and the QB output signal Vdff1QB changes from the L level to the H level. Accordingly, the N-channel transistor 22 is turned on. Since the P-channel transistor 21 is turned off and the N-channel transistor 22 is turned on, the magnitude of the current IL flowing through the inductor 23 in the normal direction begins to decrease, and the inductor potential Lout becomes lower than the ground potential. Since the N-channel gate potential NG rises from the L level to the H level, the delayed signal Vdly1 falls from the H level to the L level without delay, and the delayed signal Vdly2 and the control signal HYS rise from the L level to the H level without delay. Since the delayed signal Vdly1 falls from the H level to the L level, the frequency selection signal SEL is maintained at the H level of the previous state.

At time T15, the hysteresis comparator 33 detects that the inductor potential Lout becomes higher than the ground potential, that is, detects the reverse current of the current IL, and changes the monitoring signal COMP from the L level to the H level. The AND signal Vand1 also rises from the L level to the H level, so that the Q output signal Vdff1Q changes from the L level to the H level, and the QB output signal Vdff1QB changes from the H level to the L level. Accordingly, the N-channel gate potential NG which is the logical product of the PWM signal PWM and the QB output signal Vdff1QB changes from the H level to the L level. Thereby, the N-channel transistor 22 is turned off, and the reverse current of the current IL is shut off. The shutoff of the reverse current prevents the reduction in the efficiency of the step-down switching regulator 101. Then, the inductor potential Lout oscillates and attenuates by resonance.

At time T16 after a lapse of the predetermined time from time T15, the delayed signal Vdly1 rises from the L level to the H level, and the delayed signal Vdly2 and the control signal HYS fall from the H level to the L level. That is, after a delay of the predetermined time from the falling edge of the N-channel gate potential NG, the delayed signal Vdly1 rises, and the delayed signal Vdly2 and the control signal HYS fall. Since the delayed signal Vdly1 rises when the Q output signal Vdff1Q is at the H level, the frequency selection signal SEL is maintained at the H level. Since the control signal HYS becomes the L level, the monitoring signal COMP changes from the H level to the L level. The AND signal Vand1 which is the logical product of the monitoring signal COMP and the delayed signal Vdly2 also changes from the H level to the L level. At this time, the DFF 41 maintains the Q output signal Vdff1Q and the QB output signal Vdff1QB at the H level and the L level of the previous state, respectively.

The operation at time T17 is the same as that at time T13.

As described above, once the reverse current of the current IL is detected, the frequency selection signal SEL is fixed to the H level. When the reverse current of the current IL is not detected, that is, the inductor potential Lout does not become higher than the ground potential during the H level of the PWM signal PWM, the frequency selection signal SEL returns to the L level. In other words, the frequency selection signal SEL is at the H level in the discontinuous current mode, and is at the L level in the continuous current mode. Therefore, in the discontinuous current mode, the carrier signal VRAMP is fixed to the low frequency.

Figure 4:
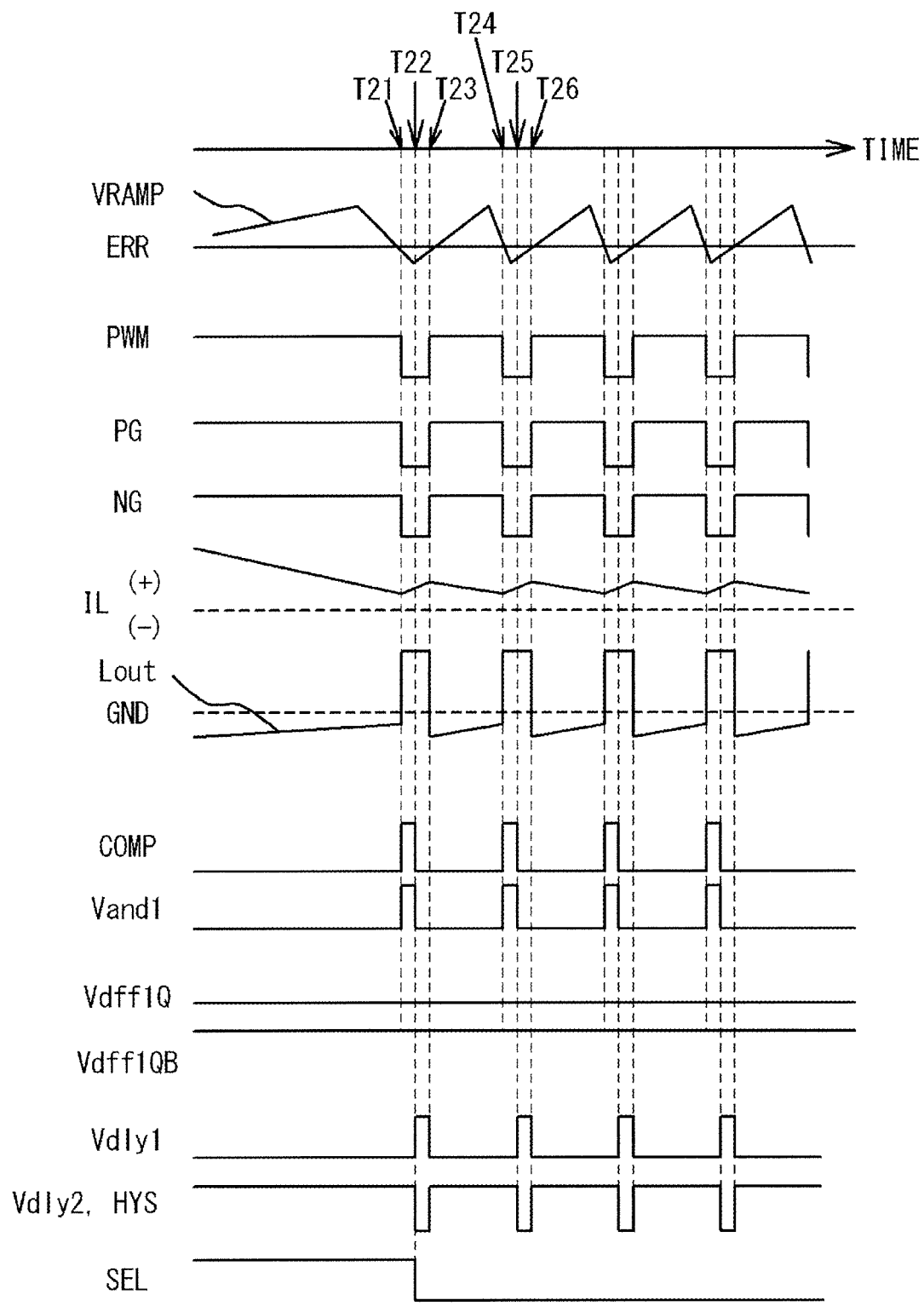
FIG. 4 is a timing chart showing operation waveforms of the step-down switching regulator according to the first embodiment when the operating condition has changed from the discontinuous current mode to the continuous current mode.

The control method when the operating condition of the step-down switching regulator 101 has changed from the discontinuous current mode to the continuous current mode will be described with reference to FIG. 4.

Before time T21, the operating condition of the step-down switching regulator 101 is the discontinuous current mode. The frequency selection signal SEL is at the H level. Therefore, the frequency of the carrier signal VRAMP is low. The potential of the carrier signal VRAMP is higher than the potential of the error signal ERR. The PWM signal PWM is at the H level. The P-channel gate potential PG is at the H level, and the P-channel transistor 21 is turned off. The N-channel gate potential NG is at the H level, and the N-channel transistor 22 is turned on. The direction of the current IL is the normal direction. The inductor potential Lout is lower than the ground potential. The monitoring signal COMP is at the L level. The AND signal Vand1 is at the L level. The Q output signal Vdff1Q is at the L level. The QB output signal Vdff1QB is at the H level. The delayed signal Vdly1 is at the L level. The delayed signal Vdly2 and the control signal HYS are at the H level.

In the duration before time T21 when the PWM signal PWM is maintained at the H level, the current IL has never become the reverse current, and the inductor potential Lout has never become higher than the ground potential; therefore, the monitoring signal COMP is maintained at the L level.

At time T21, the carrier signal VRAMP changes from the higher potential than the error signal ERR to the lower potential, and the PWM signal PWM changes from the H level to the L level. This corresponds to the case where the inductor potential Lout does not become higher than the ground potential and the reverse current of the current IL does not occur between time T14 and time T17. When the PWM signal PWM changes from the H level to the L level, the DFF 41 is reset, so that the Q output signal Vdff1Q is maintained at the L level, and the QB output signal Vdff1QB is maintained at the H level. The N-channel gate potential NG which is the logical product of the PWM signal PWM and the QB output signal Vdff1QB changes from the H level to the L level. When the PWM signal PWM changes from the H level to the L level, the P-channel gate potential PG changes from the H level to the L level. Since the P-channel transistor 21 is turned on and the N-channel transistor 22 is turned off, the current IL flowing through the inductor 23 in the normal direction begins to increase, and the inductor potential Lout becomes higher than the ground potential. Since the control signal HYS and the delayed signal Vdly2 are at the H level, the monitoring signal COMP and the AND signal Vand1 change from the L level to the H level.

At time T22 after a lapse of the predetermined time from time T21, the delayed signal Vdly1 rises from the L level to the H level, and the delayed signal Vdly2 and the control signal HYS fall from the H level to the L level. That is, after a delay of the predetermined time from the falling edge of the N-channel gate potential NG, the delayed signal Vdly1 rises, and the delayed signal Vdly2 and the control signal HYS fall. Since the delayed signal Vdly1 rises when the Q output signal Vdff1Q is at the L level, the frequency selection signal SEL changes from the H level to the L level. Accordingly, the frequency of the carrier signal VRAMP becomes high. In the continuous current mode, the frequency of the carrier signal VRAMP is fixed to a high value. Since the control signal HYS and the delayed signal Vdly2 become the L level, the monitoring signal COMP and the AND signal Vand1 change from the H level to the L level. At this time, the DFF 41 maintains the Q output signal Vdff1Q at the L level and maintains the QB output signal Vdff1QB at the H level.

At time T23, the carrier signal VRAMP changes from the lower potential than the error signal ERR to the higher potential, and the PWM signal changes from the L level to the H level. Accordingly, the P-channel gate potential PG changes from the L level to the H level, which turns off the P-channel transistor. Since the PWM signal PWM changes from the L level to the H level, the N-channel gate potential NG which is the logical product of the PWM signal PWM and the QB output signal Vdff1QB changes from the L level to the H level. Accordingly, the N-channel transistor 22 is turned on. Since the P-channel transistor 21 is turned off and the N-channel transistor 22 is turned on, the magnitude of the current IL flowing through the inductor 23 in the normal direction begins to decrease, and the inductor potential Lout becomes lower than the ground potential. Since the N-channel gate potential NG rises from the L level to the H level, the delayed signal Vdly1 falls from the H level to the L level without delay, and the delayed signal Vdly2 and the control signal HYS rise from the L level to the H level without delay. Since the delayed signal Vdly1 falls from the H level to the L level, the frequency selection signal SEL is maintained at the H level of the previous state.

At time T24, the carrier signal VRAMP changes from the higher potential than the error signal ERR to the lower potential, and the PWM signal PWM changes from the H level to the L level. When the PWM signal PWM changes from the H level to the L level, the DFF 41 is reset, so that the Q output signal Vdff1Q is maintained at the L level, and the QB output signal Vdff1QB is maintained at the H level. The N-channel gate potential NG which is the logical product of the PWM signal PWM and the QB output signal Vdff1QB changes from the H level to the L level. When the PWM signal PWM changes from the H level to the L level, the P-channel gate potential PG changes from the H level to the L level. Since the P-channel transistor 21 is turned on and the N-channel transistor 22 is turned off, the current IL flowing through the inductor 23 in the normal direction begins to increase, and the inductor potential Lout becomes higher than the ground potential. Since the control signal HYS and the delayed signal Vdly2 are at the H level, the monitoring signal COMP and the AND signal Vand1 change from the L level to the H level.

At time T25 after a lapse of the predetermined time from time T24, the delayed signal Vdly1 rises from the L level to the H level, and the delayed signal Vdly2 and the control signal HYS fall from the H level to the L level. That is, after a delay of the predetermined time from the falling edge of the N-channel gate potential NG, the delayed signal Vdly1 rises, and the delayed signal Vdly2 and the control signal HYS fall. Since the delayed signal Vdly1 rises when the Q output signal Vdff1Q is at the L level, the frequency selection signal SEL is maintained at the L level. Therefore, the continuous current mode is maintained. Since the control signal HYS and the delayed signal Vdly2 become the L level, the monitoring signal COMP and the AND signal Vand1 change from the H level to the L level. At this time, the DFF 41 maintains the Q output signal Vdff1Q at the L level and maintains the QB output signal Vdff1QB at the H level.

The operation at time T26 is the same as that at time T23.

In this embodiment, the switching regulator control circuit 61 includes the oscillator 14, the PWM comparator 15, and the transistor drive circuit 30. The oscillator 14 generates the carrier signal VRAMP. The PWM comparator 15 generates the PWM signal PWM based on the carrier signal VRAMP. The transistor drive circuit 30 drives the switching transistor 21 and the synchronous rectification transistor 22 based on the PWM signal PWM. The oscillator 14 switches the frequency of the carrier signal VRAMP based on the direction of the source-drain voltage of the synchronous rectification transistor 22 corresponding to the direction of the current IL flowing through the inductor 23. Therefore, the operating condition of the load is monitored in a direct manner, and a threshold value for distinguishing between light and heavy loads does not change depending on manufacturing variations or use conditions. Therefore, it is possible to stably enhance the efficiency of the step-down switching regulator 101 at light load.

Further, since the hysteresis comparator 33 monitors the direction of the source-drain voltage of the synchronous rectification transistor 22 corresponding to the direction of the current IL flowing through the inductor 23, it is possible to switch the frequency of the carrier signal VRAMP immediately when the reverse current flows through the inductor 23.

Further, when the direction of the source-drain voltage of the synchronous rectification transistor 22 becomes a direction in which the reverse current flows through the synchronous rectification transistor 22 in a duration when the switching transistor 21 is off and the synchronous rectification transistor 22 is on, the oscillator 14 switches the frequency of the carrier signal VRAMP from the high frequency to the low frequency. When the direction of the source-drain voltage of the synchronous rectification transistor 22 has never become the direction in which the reverse current flows through the synchronous rectification transistor 22 in the duration when the switching transistor 21 is off and the synchronous rectification transistor 22 is on, the oscillator 14 switches the frequency of the carrier signal VRAMP from the low frequency to the high frequency. By monitoring the direction of the source-drain voltage of the synchronous rectification transistor 22 and fixing the frequency of the carrier signal VRAMP every switching period, it is possible to set an appropriate carrier frequency every switching period.

Further, when the direction of the source-drain voltage of the synchronous rectification transistor 22 becomes the direction in which the reverse current flows through the synchronous rectification transistor 22 in the duration when the switching transistor 21 is off and the synchronous rectification transistor 22 is on, the transistor drive circuit 30 turns off the synchronous rectification transistor 22. Accordingly, the reverse current of the current IL is shut off, which prevents the reduction in the efficiency of the step-down switching regulator 101.

Second Embodiment

Figure 5:
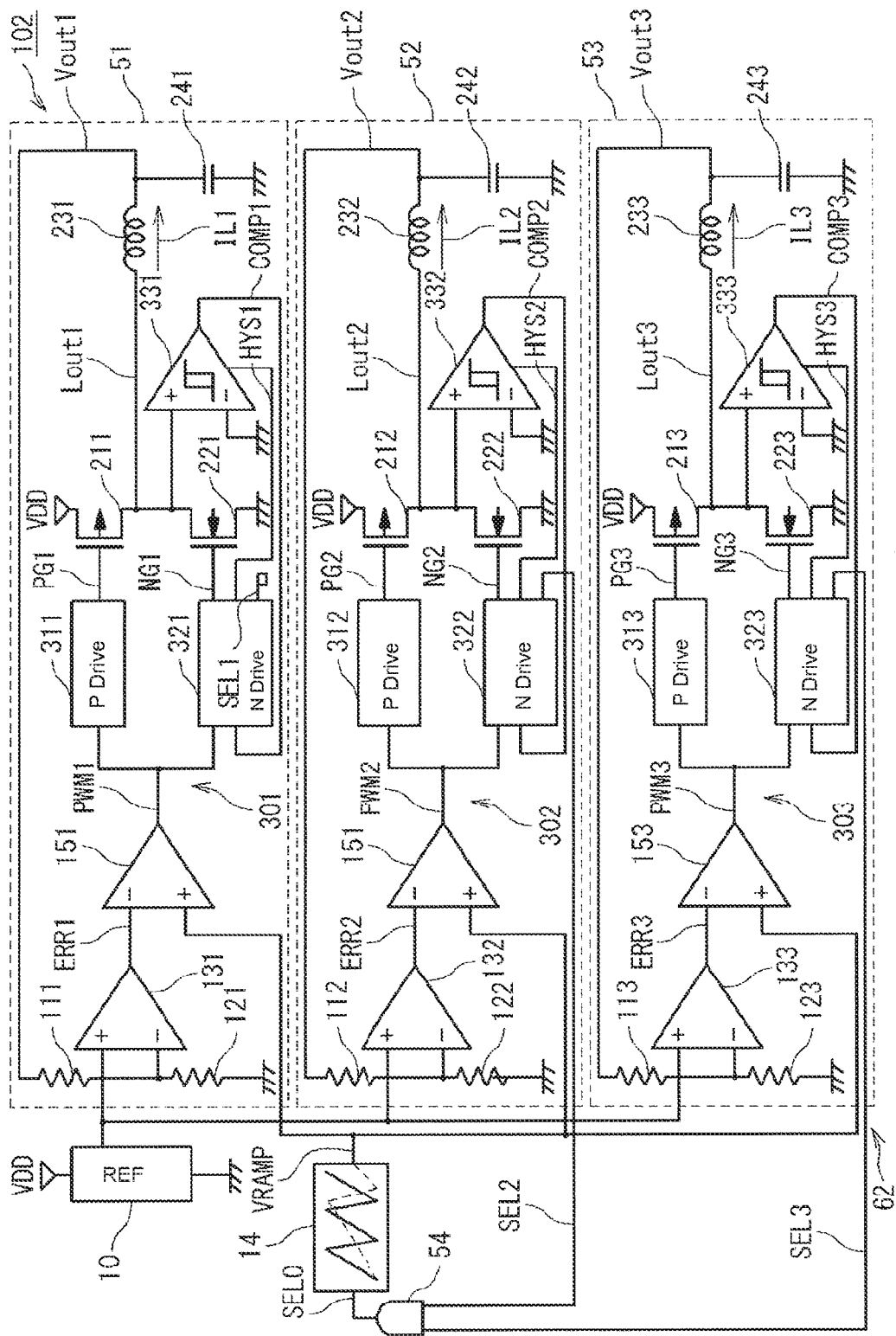
FIG. 5 is a circuit diagram of a step-down switching regulator according to a second embodiment.

A step-down switching regulator 102 according to the second embodiment will be described with reference to FIG. 5. The step-down switching regulator 102 is a multiple-output power supply system that can supply power to a plurality of loads. While this embodiment describes the step-down switching regulator 102 that includes three voltage conversion circuits 51 to 53, the step-down switching regulator 102 may include two or four voltage conversion circuits.

The step-down switching regulator 102 includes the voltage conversion circuits 51 to 53, the reference voltage circuit 10, the oscillator 14, and an AND circuit 54. The voltage conversion circuit 51 generates a relatively low first output voltage (output potential Vout1−ground potential) from the relatively high input voltage (power supply potential VDD−ground potential) and supplies the first output voltage to a first load (not shown). The voltage conversion circuit 52 generates a relatively low second output voltage (output potential Vout2−ground potential) from the relatively high input voltage (power supply potential VDD−ground potential) and supplies the second output voltage to a second load (not shown). The voltage conversion circuit 53 generates a relatively low third output voltage (output potential Vout3− ground potential) from the relatively high input voltage (power supply potential VDD–ground potential) and supplies the third output voltage to a third load (not shown).

The voltage conversion circuit 51 includes voltage detection resistors 111 and 121, a P-channel transistor 211, an N-channel transistor 221, an inductor 231, and a smoothing capacitor 241, an error amplifier 131, a PWM comparator 151, and a transistor drive circuit 301. The transistor drive circuit 301 includes a P-channel transistor drive circuit 311, an N-channel transistor drive circuit 321, and a hysteresis comparator 331. The P-channel transistor drive circuit 311 and the N-channel transistor drive circuit 321 are configured in the same manner as the P-channel transistor drive circuit 31 and the N-channel transistor drive circuit 32, respectively. The relation of connection of the voltage detection resistor 111 is the same as that of the voltage detection resistor 11. The relation of connection of the voltage detection resistor 121 is the same as that of the voltage detection resistor 12. The relation of connection of the P-channel transistor 211 is the same as that of the P-channel transistor 21. The relation of connection of the N-channel transistor 221 is the same as that of the N-channel transistor 22. The relation of connection of the inductor 231 is the same as that of the inductor 23. The relation of connection of the smoothing capacitor 241 is the same as that of the smoothing capacitor 24. The relation of connection of the error amplifier 131 is the same as that of the error amplifier 13. The relation, of connection of the PWM comparator 151 is the same as that of the PWM comparator 15. The relation of connection of the P-channel transistor drive circuit 311 is the same as that of the P-channel transistor drive circuit 31. The relation of connection of the N-channel transistor drive circuit 321 is the same as that of the N-channel transistor drive circuit 32. The relation of connection of the hysteresis comparator 331 is the same as that of the hysteresis comparator 33.

A (+) input terminal of the PWM comparator 151 is coupled to the output terminal of the oscillator 14. A SEL output terminal of the N-channel transistor drive circuit 321 is coupled nowhere. A source of the P-channel transistor 211 is coupled to the power supply potential VDD. A source of the N-channel transistor 221 is coupled to the ground potential. One terminal of the inductor 231 is coupled to a drain of the P-channel transistor 211 and a drain of the N-channel transistor 221. A potential at the one terminal of the inductor 231 is referred to as an inductor potential Lout1. The other terminal of the inductor 231 is coupled to the first load, coupled through the smoothing capacitor 241 to the ground potential, and coupled through the voltage detection resistors 111 and 121 placed in series to the ground potential. A potential at the other terminal of the inductor 231 is equal to the output potential Vout1. A current IL1 is a current flowing through the inductor 231. The direction of the current IL1 is positive (+) when the current IL1 flows from the one terminal to the other terminal of the inductor 231, that is, in the direction of an arrow in FIG. 5.

The error amplifier 131 outputs an error signal ERR1 based on the reference potential outputted by the reference voltage circuit 10 and a potential at a node between the voltage detection resistors 111 and 121. The PWM comparator 51 generates a PWM signal PWM1 based on the error signal ERR1 and the carrier signal VRAMP outputted by the oscillator 14. The P-channel transistor drive circuit 311 drives the P-channel transistor 211 based on the PWM signal PWM1. More specifically, the P-channel transistor drive circuit 311 controls a gate potential PG1 of the P-channel transistor 211 based on the PWM signal PWM1, for the on/off operation of the P-channel transistor 211. The N-channel transistor drive circuit 321 drives the N-channel transistor 221 based on the PWM signal PWM1 and a monitoring signal COMP1 outputted by the hysteresis comparator 331. More specifically, the N-channel transistor drive circuit 321 controls a gate potential NG1 of the N-channel transistor 221 based on the PWM signal PWM1 and the monitoring signal COMP1, for the on/off operation of the N-channel transistor 221. The N-channel transistor drive circuit 321 further outputs a control signal HYS1 and a frequency selection signal SEL1 based on the PWM signal PWM1 and the monitoring signal COMP1. However, since the SEL output terminal of the N-channel transistor drive circuit 321 is coupled nowhere, the frequency selection signal SEL1 is not used. The hysteresis comparator 331 outputs the monitoring signal COMP1 based on the direction of the source-drain voltage of the N-channel transistor 221 and the control signal HYS1. The monitoring signal COMP1 is a signal for monitoring whether the operating condition of the first load is a heavy load condition or a light load condition. When the control signal HYS1 is at the L level, the monitoring signal COMP1 is fixed to the L level irrespective of the direction of the source-drain voltage of the N-channel transistor 221. When the control signal HYS1 is at the H level, the monitoring signal COMP1 is set to the H level or the L level based on the direction of the source-drain voltage of the N-channel transistor 221.

The voltage conversion circuit 52 includes voltage detection resistors 112 and 122, a P-channel transistor 212, an N-channel transistor 222, an inductor 232, and a smoothing capacitor 242, an error amplifier 132, a PWM comparator 152, and a transistor drive circuit 302. The transistor drive circuit 302 includes a P-channel transistor drive circuit 312, an N-channel transistor drive circuit 322, and a hysteresis comparator 332. The voltage conversion circuit 52 is configured in the same manner as the voltage conversion circuit 51.

A (+) input terminal of the PWM comparator 152 is coupled to the output terminal of the oscillator 14. A SEL output terminal of the N-channel transistor drive circuit 322 is coupled to a first input terminal of the AND circuit 54. A source of the P-channel transistor 212 is coupled to the power supply potential VDD. A source of the N-channel transistor 222 is coupled to the ground potential. One terminal of the inductor 232 is coupled to a drain of the P-channel transistor 212 and a drain of the N-channel transistor 222. A potential at the one terminal of the inductor 232 is referred to as an inductor potential Lout2. The other terminal of the inductor 232 is coupled to the second load, coupled through the smoothing capacitor 242 to the ground potential, and coupled through the voltage detection resistors 112 and 122 placed in series to the ground potential. A potential at the other terminal of the inductor 232 is equal to the output potential Vout2. A current IL2 is a current flowing through the inductor 232. The direction of the current IL2 is positive (+) when the current IL2 flows from the one terminal to the other terminal of the inductor 232, that is, in the direction of an arrow in FIG. 5.

The error amplifier 132 outputs an error signal ERR2 based on the reference potential outputted by the reference voltage circuit 10 and a potential at a node between the voltage detection resistors 112 and 122. The PWM comparator 152 generates a PWM signal PWM2 based on the error signal ERR2 and the carrier signal VRAMP outputted by the oscillator 14. The P-channel transistor drive circuit 312 drives the P-channel transistor 212 based on the PWM signal PWM2. More specifically, the P-channel transistor drive circuit 312 controls a gate potential PG2 of the P-channel transistor 212 based on the PWM signal PWM2, for the on/off operation of the P-channel transistor 212. The N-channel transistor drive circuit 322 drives the N-channel transistor 222 based on the PWM signal PWM2 and a monitoring signal COMP2 outputted by the hysteresis comparator 332. More specifically, the N-channel transistor drive circuit 322 controls a gate potential NG2 of the N-channel transistor 222 based on the PWM signal PWM2 and the monitoring signal COMP2, for the on/off operation of the N-channel transistor 222. The N-channel transistor drive circuit 322 further outputs a control signal HYS2 and a frequency selection signal SEL2 based on the PWM signal PWM2 and the monitoring signal COMP2. The hysteresis comparator 332 outputs the monitoring signal COMP2 based on the direction of the source-drain voltage of the N-channel transistor 222 and the control signal HYS2. The monitoring signal COMP2 is a signal for monitoring whether the operating condition of the second load is a heavy load condition or a light load condition. When the control signal HYS2 is at the L level, the monitoring signal COMP2 is fixed to the L level irrespective of the direction of the source-drain voltage of the N-channel transistor 222. When the control signal HYS2 is at the H level, the monitoring signal COMP2 is set to the H level or the L level based on the direction of the source-drain voltage of the N-channel transistor 222.

The voltage conversion circuit 53 includes voltage detection resistors 113 and 123, a P-channel transistor 213, an N-channel transistor 223, an inductor 233, and a smoothing capacitor 243, an error amplifier 133, a PWM comparator 153, and a transistor drive circuit 303. The transistor drive circuit 303 includes a P-channel transistor drive circuit 313, an N-channel transistor drive circuit 323, and a hysteresis comparator 333. The voltage conversion circuit 53 is configured in the same manner as the voltage conversion circuit 51.

A (+) input terminal of the PWM comparator 153 is coupled to the output terminal of the oscillator 14. A SEL output terminal of the N-channel transistor drive circuit 323 is coupled to a second input terminal of the AND circuit 54. A source of the P-channel transistor 213 is coupled to the power supply potential VDD. A source of the N-channel transistor 223 is coupled to the ground potential. One terminal of the inductor 233 is coupled to a drain of the P-channel transistor 213 and a drain of the N-channel transistor 223. A potential at the one terminal of the inductor 233 is referred to as an inductor potential Lout3. The other terminal of the inductor 233 is coupled to the third load, coupled through the smoothing capacitor 243 to the ground potential, and coupled through the voltage detection resistors 113 and 123 placed in series to the ground potential. A potential at the other terminal of the inductor 233 is equal to the output potential Vout3. A current IL3 is a current flowing through the inductor 233. The direction of the current IL3 is positive (+) when the current IL3 flows from the one terminal to the other terminal of the inductor 233, that is, in the direction of an arrow in FIG. 5.

The error amplifier 133 outputs an error signal ERR3 based on the reference potential outputted by the reference voltage circuit 10 and a potential at a node between the voltage detection resistors 113 and 123. The PWM comparator 153 generates a PWM signal PWM3 based on the error signal ERR3 and the carrier signal VRAMP outputted by the oscillator 14. The P-channel transistor drive circuit 313 drives the P-channel transistor 213 based on the PWM signal PWM3. More specifically, the P-channel transistor drive circuit 313 controls a gate potential PG3 of the P-channel transistor 213 based on the PWM signal PWM3, for the on/off operation of the P-channel transistor 213. The N-channel transistor drive circuit 323 drives the N-channel transistor 223 based on the PWM signal PWM3 and a monitoring signal COMP3 outputted by the hysteresis comparator 333. More specifically, the N-channel transistor drive circuit 323 controls a gate potential NG3 of the N-channel transistor 223 based on the PWM signal PWM3 and the monitoring signal COMP3, for the on/off operation of the N-channel transistor 223. The N-channel transistor drive circuit 323 further outputs a control signal HYS3 and a frequency selection signal SEL3 based on the PWM signal PWM3 and the monitoring signal COMP3. The hysteresis comparator 333 outputs the monitoring signal COMP3 based on the direction of the source-drain voltage of the N-channel transistor 223 and the control signal HYS3. The monitoring signal COMP3 is a signal for monitoring whether the operating condition of the third load is a heavy load condition or a light load condition. When the control signal HYS3 is at the L level, the monitoring signal COMP3 is fixed to the L level irrespective of the direction of the source-drain voltage of the N-channel transistor 223. When the control signal HYS3 is at the H level, the monitoring signal COMP3 is set to the H level or the L level based on the direction of the source-drain voltage of the N-channel transistor 223.

The AND circuit 54 outputs a frequency selection signal SEL0 based on the frequency selection signals SEL2 and SEL3. When both the frequency selection signals SEL2 and SEL3 are at the H level, the frequency selection signal SEL0 is at the H level. Except when both the frequency selection signals SEL2 and SEL3 are at the H level, the frequency selection signal SEL0 is at the L level. The oscillator 14 generates the carrier signal VRAMP based on the frequency selection signal SEL0. The oscillator 14 sets the carrier signal VRAMP to a low frequency when the frequency selection signal SEL0 is at the H level, and sets the carrier signal VRAMP to a high frequency when the frequency selection signal SEL0 is at the L level.

A switching regulator control circuit 62 in the step-down switching regulator 102 includes the oscillator 14, the AND circuit 54, the error amplifiers 131 to 133, the PWM comparators 151 to 153, and the transistor drive circuits 301 to 303. The switching regulator control circuit 62 may be provided on a single power supply IC chip.

Figure 6:
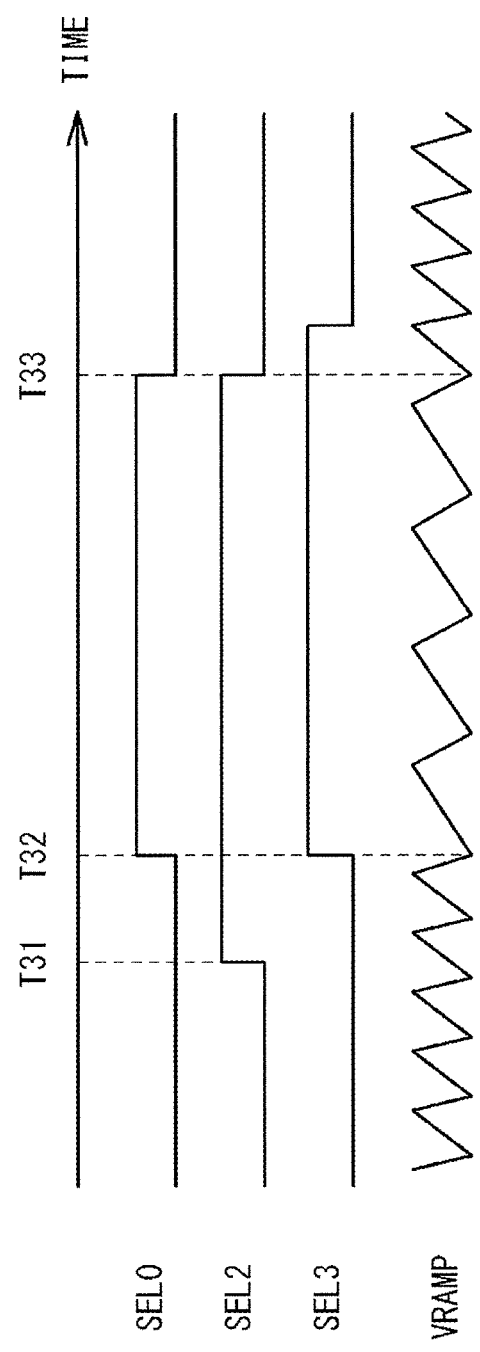
FIG. 6 is a timing chart showing operation waveforms of the step-down switching regulator according to the second embodiment.

An operation for switching the frequency of the carrier signal VRAMP in the step-down switching regulator 102 will be described with reference to FIG. 6.

Before time T31, the frequency selection signals SEL0, SEL2, and SEL3 are at the L level, and the frequency of the carrier signal VRAMP is high.

At time T31, in the voltage conversion circuit 52, the reverse current of the current IL2 is detected, and the frequency selection signal SEL2 changes from the L level to the H level. The frequency selection signal SEL0 which is the logical product of the frequency selection signals SEL2 and SEL3 remains at the L level, so that the frequency of the carrier signal VRAMP does not change.

At time T32, in the voltage conversion circuit 53 as well, the reverse current of the current IL3 is detected, and the frequency selection signal SEL3 changes from the L level to the H level. Since both the frequency selection signals SEL2 and SEL3 become the H level, the frequency selection signal SEL0 changes from the L level to the H level. Therefore, the frequency of the carrier signal VRAMP switches from the high frequency to the low frequency.

At time T33, when the frequency selection signal SEL2 changes from the H level to the L level because the reverse current of the current IL2 is not detected in the voltage conversion circuit 52, the frequency selection signal SEL0 which is the logical product of the frequency selection signals SEL2 and SEL3 also changes from the H level to the L level. Therefore, the frequency of the carrier signal VRAMP switches from the low frequency to the high frequency.

That is, the operating period of the voltage conversion circuits 51, 52, and 53 is determined based on the frequency selection signals SEL2 and SEL3 outputted from the voltage conversion circuits 52 and 53.

The advantageous effects of the step-down switching regulator 102 according to the second embodiment will be described below. If the voltage conversion circuits 51 to 53 include individual oscillators to switch carrier frequencies with the frequency selection signals SEL1 to SEL3 respectively, the probability that the voltage conversion circuits 51 to 53 operate at the same carrier frequency is 25%. The other 75% probability is that the carrier frequencies of the voltage conversion circuits 51 to 53 contain both the high and low frequencies. Further, the switching timings of the carrier frequencies are variable, depending on the loads. In the system including microcontrollers as the loads and the step-down switching regulator 102, if the carrier frequencies of the voltage conversion circuits 51 to 53 change independently of each other, the voltage conversion circuits 51 to 53, as well as the PFM switching regulator, might become a noise source to other systems. By changing the carrier frequencies of the voltage conversion circuits 51 to 53 simultaneously as described above, it is possible to prevent the voltage conversion circuits 51 to 53 from becoming the noise source to other systems. In this case, the probability that the voltage conversion circuits 51 to 53 operate at the same carrier frequency is 100%. This operation is very effective in greatly reducing the possibility that the voltage conversion circuits 51 to 53 become the noise source.

In the step-down switching regulator 102, the frequency selection signal SEL1 outputted by the voltage conversion circuit 51 does not affect the frequency control of the carrier signal VRAMP generated by the oscillator 14. This is because the first load to which the voltage conversion circuit 51 supplies power is assumed to be lighter than the second load and the third load. The first to third loads to which the step-down switching regulator 102 supplies power rarely have the same load level. For example, the second load and the third load to which the voltage conversion circuits 52 and 53 supply power are on the order of several amperes, whereas the first load to which the voltage conversion circuit 51 supplies power is on the order of several hundred milliamperes. In this case, the size of the P-channel and N-channel transistors 212, 213, 222, and 223 in the voltage conversion circuits 52 and 53 is larger than the size of the P-channel and N-channel transistors 211 and 221 in the voltage conversion circuit 51. Further, in this case, the P-channel and N-channel transistor drive circuits 312, 313, 322, and 323 in the voltage conversion circuits 52 and 53 is larger than the size of the P-channel and N-channel transistor drive circuits 311 and 321 in the voltage conversion circuit 51. The light load condition of the second load and the third load reduces the efficiency due to the power consumption of these large-sized circuits. Therefore, it is effective in enhancing the efficiency to switch the frequency of the carrier signal VRAMP based on the frequency selection signals SEL2 and SEL3 outputted by the voltage conversion circuits 52 and 53.

Further, in the case where the second load is heavier than the first load and the third load, the oscillator 14 may switch the frequency of the carrier signal VRAMP based only on the frequency selection signal SEL2 without having the AND circuit 54. Further, the voltage conversion circuit 51 may be deleted.

This embodiment is grasped as follows for example. The switching regulator control circuit 62 includes the oscillator 14, the PWM comparator 152, the transistor drive circuit 302, the PWM comparator 153, and the transistor drive circuit 303. The oscillator 14 generates the carrier signal VRAMP. The PWM comparator 152 generates the PWM signal PWM2 based on the carrier signal VRAMP. The transistor drive circuit 302 drives the switching transistor 212 and the synchronous rectification transistor 222 based on the PWM signal PWM2. The PWM comparator 153 generates the PWM signal PWM3 based on the carrier signal VRAMP. The transistor drive circuit 303 drives the switching transistor 213 and the synchronous rectification transistor 223 based on the PWM signal PWM3. The oscillator 14 switches the frequency of the carrier signal VRAMP based on the direction of the source-drain voltage of the synchronous rectification transistor 222. The operating frequency of the voltage conversion circuit 52 including the switching transistor 212 and the synchronous rectification transistor 222 and the operating frequency of the voltage conversion circuit 53 including the switching transistor 213 and the synchronous rectification transistor 223 are the same and change simultaneously, which reduces the possibility that the voltage conversion circuits 52 and 53 become the noise source. This corresponds to both cases with and without the AND circuit 54.

Further, in the case where the AND circuit 54 is provided, this embodiment is grasped as follows for example. The transistor drive circuit 302 outputs the frequency selection signal SEL2. When the direction of the source-drain voltage of the synchronous rectification transistor 222 becomes a direction in which the reverse current flows through the synchronous rectification transistor 222 in a duration when the switching transistor 212 is off and the synchronous rectification transistor 222 is on, the frequency selection signal SEL2 changes from the L level to the H level. When the direction of the source-drain voltage of the synchronous rectification transistor 222 has never become the direction in which the reverse current flows through the synchronous rectification transistor 222 in the duration when the switching transistor 212 is off and the synchronous rectification transistor 222 is on, the frequency selection signal SEL2 changes from the H level to the L level. The transistor drive circuit 303 outputs the frequency selection signal SEL3. When the direction of the source-drain voltage of the synchronous rectification transistor 223 becomes a direction in which the reverse current flows through the synchronous rectification transistor 223 in a duration when the switching transistor 213 is off and the synchronous rectification transistor 223 is on, the frequency selection signal SEL3 changes from the L level to the H level. When the direction of the source-drain voltage of the synchronous rectification transistor 223 has never become the direction in which the reverse current flows through the synchronous rectification transistor 223 in the duration when the switching transistor 213 is off and the synchronous rectification transistor 223 is on, the frequency selection signal SEL3 changes from the H level to the L level. When the frequency selection signal SEL2 is at the H level and the frequency selection signal SEL3 is at the H level, the carrier signal VRAMP has the low frequency. Except when the frequency selection signal SEL2 is at the H level and the frequency selection signal SEL3 is at the H level, the carrier signal VRAMP has the high frequency.

Third Embodiment

Figure 7:
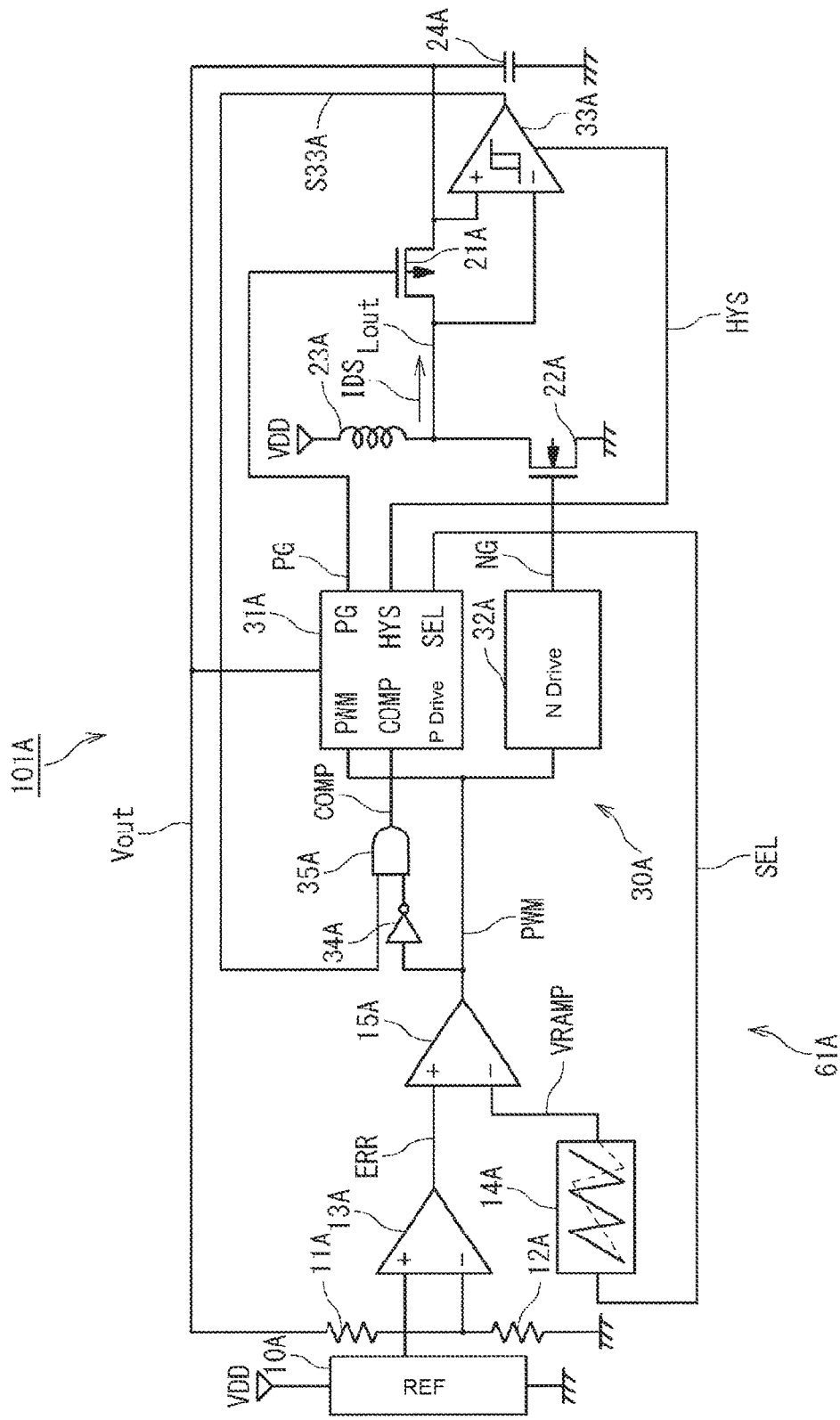
FIG. 7 is a circuit diagram of a step-up switching regulator according to a third embodiment.

A step-up switching regulator 101A according to the third embodiment will be described with reference to FIG. 7. The step-up switching regulator 101A is used to generate a relatively high output voltage (output potential Vout–ground potential) from a relatively low input voltage (power supply potential VDD–ground potential) and supply the output voltage to a load (not shown). The load is, for example, a microcontroller. The step-up switching regulator 101A includes a reference voltage circuit 10A, voltage detection resistors 11A and 12A, a switching regulator control circuit 61A, a P-channel transistor 21A, an N-channel transistor 22A, an inductor 23A, and a smoothing capacitor 24A. The P-channel transistor 21A is occasionally referred to as a P-channel output power transistor. The N-channel transistor 22A is occasionally referred to as an N-channel output power transistor. The P-channel transistor 21A is, for example, a P-channel MOSFET. The N-channel transistor 22A is, for example, an N-channel MOSFET. The inductor 23 is, for example, a coil. The switching regulator control circuit 61A includes an error amplifier 13A, an oscillator 14A, a PWM comparator 15A, and a transistor drive circuit 30A. The transistor drive circuit 30A includes a P-channel transistor drive circuit 31A, an N-channel transistor drive circuit 32A, a hysteresis comparator 33A, an inverter 34A, and an AND circuit 35A. The switching regulator control circuit 61A may be provided on a single power supply IC chip.

The P-channel transistor 21A is occasionally referred to as a synchronous rectification transistor 21A. The N-channel transistor 22A is occasionally referred to as a switching transistor 22A. The P-channel transistor drive circuit 31A is occasionally referred to as a synchronous rectification transistor drive circuit 31A. The N-channel transistor drive circuit 32A is occasionally referred to as a switching transistor drive circuit 32A.

A source of the N-channel transistor 22A is coupled to the ground potential. A drain of the N-channel transistor 22A is coupled to one terminal of the inductor 23A and a drain of the P-channel transistor 21A. A potential at the one terminal of the inductor 23A is referred to as an inductor potential Lout. The inductor potential Lout, the drain potential of the P-channel transistor 21A, and the drain potential of the N-channel transistor 22A are equal to each other. The other terminal of the inductor 23A is coupled to the power supply potential VDD. A source of the P-channel transistor 21A is coupled to the load, coupled through the smoothing capacitor 24A to the ground potential, and coupled through the voltage detection resistors 11A and 12A placed in series to the ground potential. A potential at the source of the P-channel transistor 21A is equal to the output potential Vout. A current IDS is a current flowing through the drain-source of the P-channel transistor 21A. The direction of the current IDS is positive (+) when the current IDS flows from the drain to the source of the P-channel transistor 21A, that is, in the direction of an arrow in FIG. 7. The direction of the current IDS is negative (−) when the current IDS flows in the direction reverse to the arrow. The reference voltage circuit 10A is coupled to the power supply potential VDD and coupled to the ground potential. An output terminal of the reference voltage circuit 10A is coupled to a (+) input terminal of the error amplifier 13A. A node between the voltage detection resistors 11A and 12A is coupled to a (−) input terminal of the error amplifier 13A. An output terminal of the error amplifier 13A is coupled to a (+) input terminal of the PWM comparator 15A. An output terminal of the oscillator 14A is coupled to a (−) input terminal of the PWM comparator 15A. An output terminal of the PWM comparator 15A is coupled to an input terminal of the inverter 34A, a PWM input terminal of the P-channel transistor drive circuit 31A, and an input terminal of the N-channel transistor drive circuit 32A. A first input terminal of the AND circuit 35A is coupled to an output terminal of the hysteresis comparator 33A. A second input terminal of the AND circuit 35A is coupled to an output terminal of the inverter 34A. An output terminal of the AND circuit 35A is coupled to a COMP input terminal of the P-channel transistor drive circuit 31A. A PG output terminal of the P-channel transistor drive circuit 31A is coupled to a gate of the P-channel transistor 21A. An HYS output terminal of the P-channel transistor drive circuit 31A is coupled to a control signal input terminal of the hysteresis comparator 33A. A SEL output terminal of the P-channel transistor drive circuit 31A is coupled to an input terminal of the oscillator 14A. An output terminal of the N-channel transistor drive circuit 32A is coupled to a gate of the N-channel transistor 22A. A (−) input terminal of the hysteresis comparator 33A is coupled to the drain of the P-channel transistor 21A. A (+) input terminal of the hysteresis comparator 33A is coupled to the source of the P-channel transistor 21A.

The reference voltage circuit 10A outputs a reference potential based on the power supply potential VDD and the ground potential. The error amplifier 13A outputs an error signal ERR based on the reference potential and a potential at the node between the voltage detection resistors 11A and 12A. In other words, the error amplifier 13A outputs the error signal ERR based on a reference voltage (reference potential–ground potential) and a voltage (potential at the node between the voltage detection resistors 11A and 12A–ground potential) obtained by dividing the output voltage (output potential Vout–ground potential). The oscillator 14A generates a carrier signal VRAMP based on a frequency selection signal SEL outputted by the P-channel transistor drive circuit 31A. The carrier signal VRAMP is a triangular signal or a sawtooth signal. The oscillator 14A switches the frequency of the carrier signal VRAMP based on the frequency selection signal SEL. The oscillator 14A sets the carrier signal to a low frequency when the frequency selection signal SEL is at an H level, and sets the carrier signal to a high frequency when the frequency selection signal SEL is at an L level. The oscillator 14A can change the frequency of the carrier signal, for example in accordance with the method disclosed in Japanese Unexamined Patent Publication No. Hei 11 (1999)-155281. The PWM comparator 15A generates a PWM signal PWM based on the error signal ERR and the carrier signal VRAMP.

The operations of the inverter 34A and the AND circuit 35A will be described. The inverter 34A outputs an inverted signal of the PWM signal PWM. The AND circuit 35A outputs a monitoring signal COMP based on a comparator output signal S33A outputted by the hysteresis comparator 33A and the inverted signal of the PWM signal PWM. The monitoring signal COMP is an AND signal of the comparator output signal S33A and the inverted signal of the PWM signal PWM. Therefore, when the PWM signal is at the L level and the comparator output signal S33A is at the H level, the monitoring signal COMP is at the H level. Except when the PWM signal is at the L level and the comparator output signal S33A is at the H level, the monitoring signal COMP is at the L level. The monitoring signal COMP is a signal for monitoring whether the operating condition of the load is a heavy load condition or a light load condition. The heavy load condition is, for example, a condition during operation of the load. The light load condition is, for example, a condition during standby of the load.

The P-channel transistor drive circuit 31A drives the P-channel transistor 21A based on the PWM signal PWM and the monitoring signal COMP. More specifically, the P-channel transistor drive circuit 31A controls a gate potential PG of the P-channel transistor 21A based on the PWM signal PWM and the monitoring signal COMP, for the on/off operation of the P-channel transistor 21A. The P-channel transistor 21A is turned off when the PWM signal PWM is at the H level, and turned on or off when the PWM signal PWM is at the L level. The reason why the P-channel transistor 21A may be turned off when the PWM signal PWM is at the L level is that the P-channel gate potential PG depends not only on the PWM signal PWM but also on the monitoring signal COMP. In order that the H level of the P-channel gate potential PG can be equal to the output potential Vout, the P-channel transistor drive circuit 31A is coupled to the output potential Vout. The P-channel transistor drive circuit 31A further outputs a control signal HYS and the frequency selection signal SEL based on the PWM signal PWM and the monitoring signal COMP. The hysteresis comparator 33A outputs the comparator output signal S33A based on the direction of the source-drain voltage of the P-channel transistor 21A and the control signal HYS. When the control signal HYS is at the L level, the comparator output signal S33A is fixed to the L level irrespective of the direction of the source-drain voltage of the P-channel transistor 21A. When the control signal HYS is at the H level, the comparator output signal S33A is set to the H level or the L level based on the direction of the source-drain voltage of the P-channel transistor 21A. That is, when the control signal input terminal is at the L level, the output terminal of the hysteresis comparator 33A is at the L level irrespective of potentials at the (+) input terminal and (−) input terminal of the hysteresis comparator 33A. When the control signal input terminal is at the H level and a potential at the (+) input terminal of the hysteresis comparator 33A is higher than a potential at the (−) input terminal, the output terminal of the hysteresis comparator 33A is at the H level. When the control signal input terminal is at the H level and a potential at the (+) input terminal of the hysteresis comparator 33A is lower than a potential at the (−) input terminal, the output terminal of the hysteresis comparator 33A is at the L level. The N-channel transistor drive circuit 32A drives the N-channel transistor 22A based on the PWM signal PWM. More specifically, the N-channel transistor drive circuit 32A controls a gate potential NG of the N-channel transistor 22A based on the PWM signal PWM, for the on/off operation of the N-channel transistor 22A. The N-channel transistor 22A is turned on when the PWM signal PWM is at the H level, and turned off when the PWM signal PWM is at the L level. That is, the N-channel transistor 22A is turned on and off when the output terminal of the PWM comparator 15A from which the PWM signal PWM is outputted is at the H level and the L level, respectively.

Figure 8:
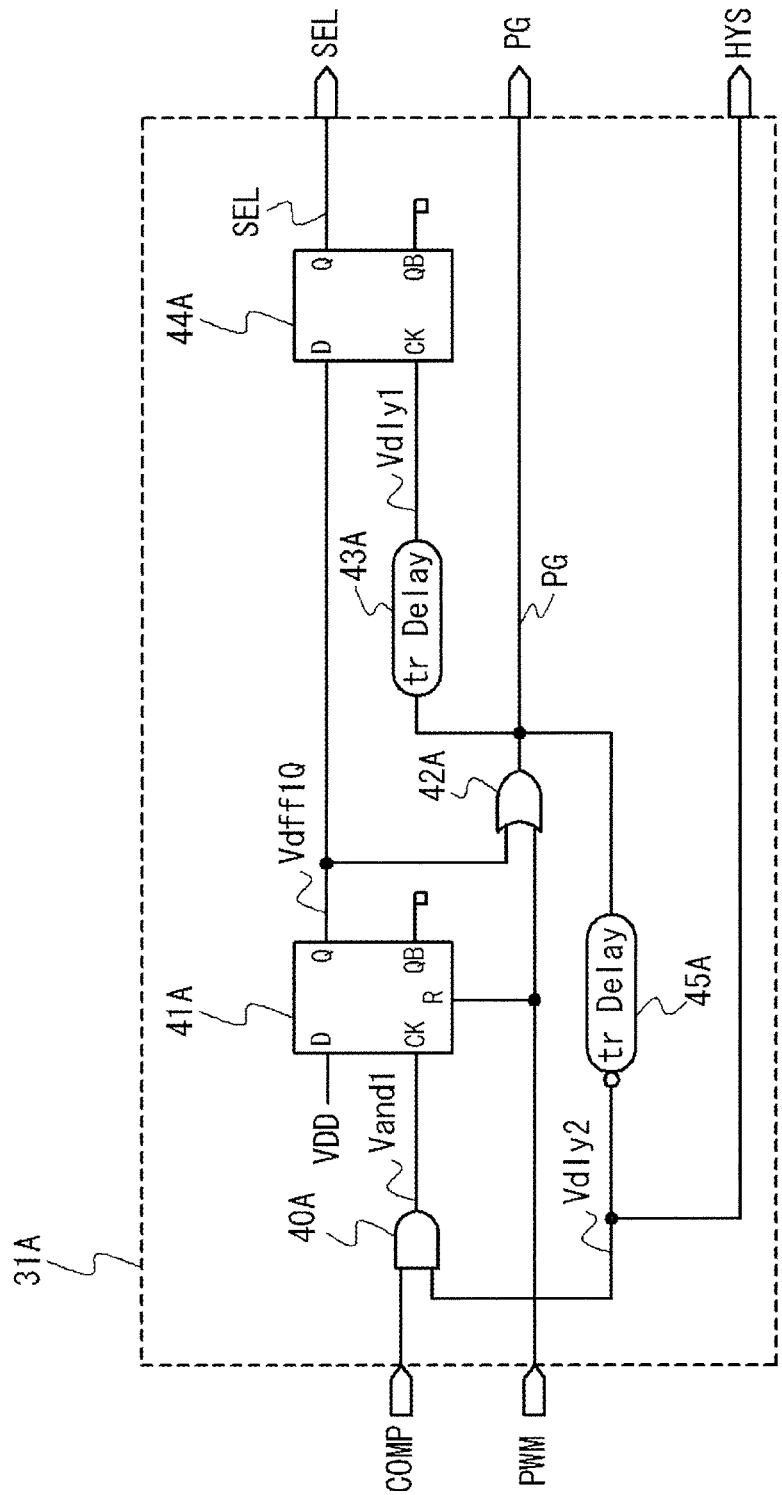
FIG. 8 is a circuit diagram of a P-channel transistor drive circuit in the step-up switching regulator according to the third embodiment.

The P-channel transistor drive circuit 31A will be described in detail with reference to FIG. 8. The P-channel transistor drive circuit 31A includes an AND circuit 40A, a DFF 41A, an OR circuit 42A, a rise delay circuit 43A, a DFF 44A, and a rise delay inverting circuit 45A. A first input terminal of the AND circuit 40A is coupled to the COMP input terminal of the P-channel transistor drive circuit 31A. A second input terminal of the AND circuit 40A is coupled to an output terminal of the rise delay inverting circuit 45A. An output terminal of the AND circuit 40A is coupled to a CK input terminal of the DFF 41A. A D input terminal of the DFF 41A is coupled to the power supply potential VDD. An R (reset) input terminal of the DFF 41A is coupled to the PWM input terminal of the P-channel transistor drive circuit 31A. A Q output terminal of the DFF 41A is coupled to a D input terminal of the DFF 44A and a first input terminal of the OR circuit 42A. A QB output terminal of the DFF 41A is coupled nowhere. A second input terminal of the OR circuit 42A is coupled to the PWM input terminal of the P-channel transistor drive circuit 31A. An output terminal of the OR circuit 42A is coupled to an input terminal of the rise delay circuit 43A, the PG output terminal of the P-channel transistor drive circuit 31A, and an input terminal of the rise delay inverting circuit 45A. An output terminal of the rise delay circuit 43A is coupled to a CK input terminal of the DFF 44A. A Q output terminal of the DFF 44A is coupled to the SEL output terminal of the P-channel transistor drive circuit 31A. A QB output terminal of the DFF 44A is coupled nowhere. The output terminal of the rise delay inverting circuit 45A is coupled to the second input terminal of the AND circuit 40A and the HYS output terminal of the P-channel transistor drive circuit 31A.

The AND circuit 40A outputs an AND signal Vand1 based on the monitoring signal COMP and a delayed signal Vdly2 outputted by the rise delay inverting circuit 45A. When both the monitoring signal COMP and the delayed signal Vdly2 are at the H level, the AND signal Vand1 is at the H level. Except when both the monitoring signal COMP and the delayed signal Vdly2 are at the H level, the AND signal Vand1 is at the H level, the AND signal Vand1 is at the L level.

The DFF 41A outputs a Q output signal Vdff1Q based on the power supply potential VDD, the AND signal Vand1, and the PWM signal PWM. Since the D input terminal of the DFF 41A is fixed to the H level by the power supply potential VDD; when the AND signal Vand1 rises from the L level to the H level, the Q output signal Vdff1Q in the next state is at the H level. When the AND signal Vand1 falls from the H level to the L level, the Q output signal Vdff1Q in the next state maintains the previous state. When the PWM signal rises from the L level to the H level, the Q output signal Vdff1Q is reset to the L level.

The OR circuit 42A outputs the P-channel gate potential PG based on the Q output signal Vdff1Q and the PWM signal PWM. The P-channel gate potential PG is an OR signal of the Q output signal Vdff1Q and the PWM signal PWM. Therefore, when at least one of the Q output signal Vdff1Q and the PWM signal PWM is at the H level, the P-channel gate potential PG is at the H level. When both the Q output signal Vdff1Q and the PWM signal PWM are at the L level, the P-channel gate potential PG is at the L level. When the P-channel gate potential PG is at the H level, that is, the output terminal of the OR circuit 42A is at the H level, the P-channel transistor 21A is turned off. When the P-channel gate potential PG is at the L level, that is, the output terminal of the OR circuit 42A is at the L level, the P-channel transistor 21A is turned on.

The rise delay circuit 43A outputs a delayed signal Vdly1 based on the P-channel gate potential PG. When the P-channel gate potential PG rises from the L level to the H level, the delayed signal Vdly1 rises from the L level to the H level after a delay of a predetermined time. When the P-channel gate potential PG falls from the H level to the L level, the delayed signal Vdly1 falls from the H level to the L level without delay.

The DFF 44A outputs a Q output the frequency selection signal SEL based on the Q output signal Vdff1Q and the delayed signal Vdly1. When the delayed signal Vdly1 rises from the L level to the H level when the Q output signal Vdff1Q is at the L level, the frequency selection signal SEL in the next state is at the L level. When the delayed signal Vdly1 rises from, the L level to the H level when the Q output signal Vdff1Q is at the H level, the frequency selection signal SEL in the next state is at the H level. When the delayed signal Vdly1 falls from the H level to the L level, the frequency selection signal SEL in the next state maintains the previous state. The output terminal of the DFF 44A assumes the same level as the frequency selection signal SEL.

The rise delay inverting circuit 45A outputs the delayed signal Vdly2 based on the P-channel gate potential PG. When the P-channel gate potential PG rises from the L level to the H level, the delayed signal Vdly2 falls from the H level to the L level after a delay of the predetermined time. When the P-channel gate potential PG falls from the H level to the L level, the delayed signal Vdly2 rises from the L level to the H level without delay. The delayed signal Vdly2 is outputted as the control signal HYS from the P-channel transistor drive circuit 31A to the hysteresis comparator 33A.

Since the monitoring signal COMP is not directly inputted to the CK input terminal of the DFF 41A, and the AND signal Vand1 outputted by the AND circuit 40A based on the monitoring signal COMP and the delayed signal Vdly2 is inputted to the CK input terminal of the DFF 41A, the DFF 41A is prevented from malfunctioning due to the noise of the monitoring signal COMP.

In this embodiment, it is determined that the load is in the heavy load condition when the step-up switching regulator 101A is in a continuous current mode, and the load is in the light load condition when the step-up switching regulator 101A is in a discontinuous current mode.

The continuous current mode and the discontinuous current mode of the step-up switching regulator 101A will be described. In one period of the step-up switching regulator 101A, energy is supplied to the inductor 23A, and the energy is released from the inductor 23A to the smoothing capacitor 24A. During the supply of energy to the inductor 23A, the N-channel transistor 22A is turned on, and the P-channel transistor 21A is turned off. During the release of energy from the inductor 23A to the smoothing capacitor 24A, the N-channel transistor 22A is turned off, and the P-channel transistor 21A is turned on. In the continuous current mode, the current IDS always flows through the P-channel transistor 21A in the direction of the arrow in FIG. 7 during the on state of the P-channel transistor 21A. This is because the next supply is started before the energy stored in the inductor 23A is completely released. In the discontinuous current mode, the direction of the current IDS flowing through the source-drain of the P-channel transistor 21A changes from the direction of the arrow in FIG. 7 to the reverse direction during the on state of the P-channel transistor 21A. This is because the energy stored in the inductor 23A is completely released. The current IDS flowing in the direction reverse to the arrow in FIG. 7 passes through the smoothing capacitor 24A, the source of the P-channel transistor 21A, the drain of the P-channel transistor 21A, and the inductor 23A. The current IDS in the reverse direction is occasionally referred to as a reverse current.

As for the relationship between the output potential Vout and the inductor potential Lout, the inductor potential Lout is always higher than the output potential Vout during the release of energy from the inductor 23A in the continuous current mode, whereas the inductor potential Lout becomes lower than the output potential Vout when the current IDS becomes the reverse current during the release of energy from the inductor 23A in the discontinuous current mode. The hysteresis comparator 33A is provided to detect that the inductor potential Lout becomes lower than the output potential Vout, that is, the drain potential of the P-channel transistor 21A becomes lower than the source potential. Since the (+) input and (−) input of the hysteresis comparator 33A are coupled to the output potential Vout and the inductor potential Lout (source and drain of the P-channel transistor 21A) respectively, the hysteresis comparator 33A outputs the comparator output signal S33A of the H level when the current IDS becomes the reverse current.

The monitoring signal COMP is based on the comparator output signal S33A, the P-channel transistor drive circuit 31A outputs the frequency selection signal SEL based on the monitoring signal COMP, and the oscillator 14A switches the frequency of the carrier signal VRAMP based on the frequency selection signal SEL. Therefore, the oscillator 14A switches the frequency of the carrier signal VRAMP based on the direction of the source-drain voltage of the P-channel transistor 21A. Therefore, in this embodiment, the operating condition of the load is monitored in a direct manner, and the determination of the operating condition of the load is less affected by manufacturing variations or use conditions. This can stably enhance the efficiency of the switching regulator at light load.

Hereinafter, the control method of the step-up switching regulator 101A will be described.

Figure 9:
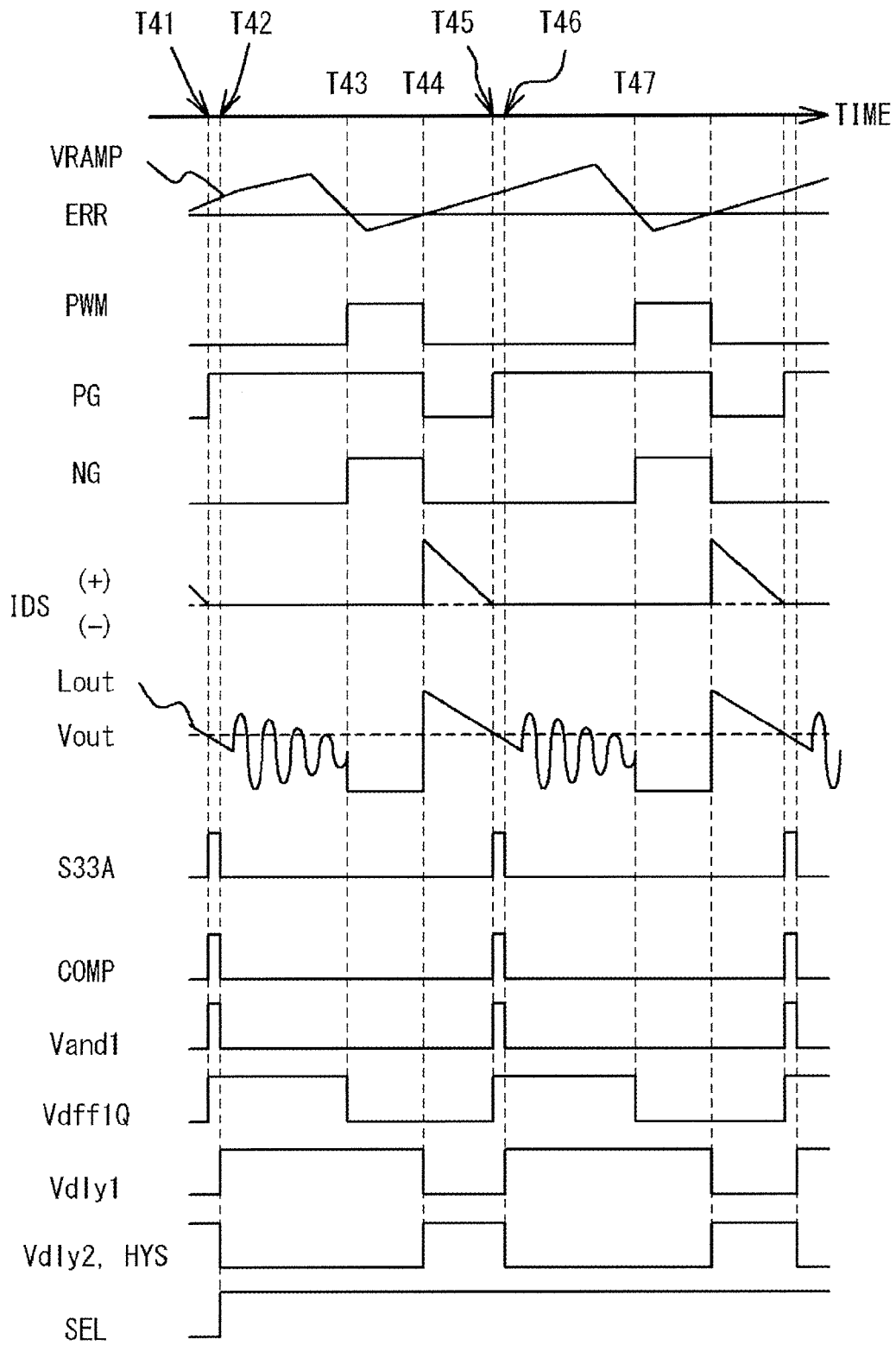
FIG. 9 is a timing chart showing operation waveforms of the step-up switching regulator according to the third embodiment when the operating condition has changed from the continuous current mode to the discontinuous current mode.

The control method when the operating condition of the step-up switching regulator 101A has changed from the continuous current mode to the discontinuous current mode will be described with reference to FIG. 9.

Before time T41, the operating condition of the step-up switching regulator 101A is the continuous current mode. The frequency selection signal SEL is at the L level. Therefore, the frequency of the carrier signal VRAMP is high. The potential of the carrier signal VRAMP is higher than the potential of the error signal ERR. The PWM signal PWM is at the L level. The P-channel gate potential PG is at the L level, and the P-channel transistor 21A is turned on. The N-channel gate potential NG is at the L level, and the N-channel transistor 22A is turned off. The direction of the current IDS is the normal direction. The inductor potential Lout is higher than the output potential Vout. The comparator output signal S33A is at the L level. The monitoring signal COMP is at the L level. The AND signal Vand1 is at the L level. The Q output signal Vdff1Q is at the L level. The delayed signal Vdly1 is at the L level. The delayed signal Vdly2 and the control signal HYS are at the H level.

At time T41, the hysteresis comparator 33A detects that the inductor potential Lout (drain potential of the P-channel transistor 21A) becomes lower than the output potential Vout (source potential of the P-channel transistor 21A), that is, detects the reverse current of the current IDS, and changes the comparator output signal S33A from the L level to the H level. Accordingly, the monitoring signal COMP changes from the L level to the H level, and the AND signal Vand1 which is the logical product of the monitoring signal COMP and the delayed signal Vdly2 changes from the L level to the H level. Since the AND signal Vand1 rises from the L level to the H level, the Q output signal Vdff1Q changes from the L level to the H level. Accordingly, the P-channel gate potential PG which is the logical sum of the PWM signal PWM and the Q output signal Vdff1Q changes from the L level to the H level. Thereby, the P-channel transistor 21A is turned off, and the reverse current of the current IDS is shut off. The shutoff of the reverse current prevents the reduction in the efficiency of the step-up switching regulator 101A.

At time T42 after a lapse of a predetermined time from time T41, the delayed signal Vdly1 rises from the L level to the H level, and the delayed signal Vdly2 and the control signal HYS fall from the H level to the L level. That is, after a delay of the predetermined time from the rising edge of the P-channel gate potential PG, the delayed signal Vdly1 rises, and the delayed signal Vdly2 and the control signal HYS fall. Since the delayed signal Vdly1 rises when the Q output signal Vdff1Q is at the H level, the frequency selection signal SEL changes from the L level to the H level. Accordingly, the frequency of the carrier signal VRAMP becomes low. Since the control signal HYS becomes the L level, the comparator output signal S33A changes from the H level to the L level. Accordingly, the monitoring signal COMP changes from the H level to the L level. The AND signal Vand1 which is the logical product of the monitoring signal COMP and the delayed signal Vdly2 also changes from the H level to the L level. At this time, the DFF 41A maintains the Q output signal Vdff1Q at the H level of the previous state.

After time T42, the inductor potential Lout starts to oscillate by resonance. However, since the control signal HYS is at the L level, the comparator output signal S33A is maintained at the L level even when the inductor potential Lout becomes lower than the output potential Vout.

At time T43, the carrier signal VRAMP changes from a higher potential than the error signal ERR to a lower potential, and the PWM signal PWM changes from the L level to the H level. Accordingly, the N-channel gate potential NG changes from the L level to the H level, which turns on the N-channel transistor 22A. Consequently, the inductor potential Lout becomes equal to the ground potential. That is, the inductor potential Lout becomes lower than the output potential Vout. However, since the control signal HYS is at the L level, the comparator output signal S33A is maintained at the L level. Since the comparator output signal S33A is maintained at the L level, the monitoring signal COMP and the AND signal Vand1 are also maintained at the L level. Further, since the PWM signal PWM changes from the L level to the H level, the DFF 41A is reset, so that the Q output signal Vdff1Q changes from the H level to the L level. The P-channel gate potential PG which is the logical sum of the PWM signal PWM and the Q output signal Vdff1Q is maintained at the H level, and the P-channel transistor 21A is maintained in the off state. Since the P-channel gate potential PG is maintained at the H level, the delayed signal Vdly1 is maintained at the H level, and the delayed signal Vdly2 and the control signal HYS are maintained at the L level.

At time T44, the carrier signal VRAMP changes from the lower potential than the error signal ERR to the higher potential, and the PWM signal PWM changes from the H level to the L level. Accordingly, the N-channel gate potential NG changes from the H level to the L level, which turns off the N-channel transistor 22A. Since the PWM signal PWM changes from the H level to the L level, the P-channel gate potential PG which is the logical sum of the PWM signal PWM and the Q output signal Vdff1Q changes from the H level to the L level. Accordingly, the P-channel transistor 21A is turned on. Since the N-channel transistor 22A is turned off and the P-channel transistor 21A is turned on, the current IDS flows through the P-channel transistor 21A in the normal direction, and the inductor potential Lout becomes higher than the output potential Vout. Since the P-channel gate potential PG falls from the H level to the L level, the delayed signal Vdly1 falls from the H level to the L level without delay, and the delayed signal Vdly2 and the control signal HYS rise from the L level to the H level without delay. Since the delayed signal Vdly1 falls from the H level to the L level, the frequency selection signal SEL is maintained at the H level of the previous state.

At time T45, the hysteresis comparator 33A detects that the inductor potential Lout becomes lower than the output potential Vout, that is, detects the reverse current of the current IDS, and changes the comparator output signal S33A from the L level to the H level. Thereby, the monitoring signal COMP and the AND signal Vand1 also change from the L level to the H level. Since the AND signal Vand1 rises from the L level to the H level, the Q output signal Vdff1Q changes from the L level to the H level. Accordingly, the P-channel gate potential PG which is the logical sum of the PWM signal PWM and the Q output signal Vdff1Q changes from the L level to the H level. Thereby, the P-channel transistor 21A is turned off, and the reverse current of the current IDS is shut off. The shutoff of the reverse current prevents the reduction in the efficiency of the step-up switching regulator 101A.

At time T46 after a lapse of the predetermined time from time T45, the delayed signal Vdly1 rises from the L level to the H level, and the delayed signal Vdly2 and the control signal HYS fall from the H level to the L level. That is, after a delay of the predetermined time from the rising edge of the P-channel gate potential PG, the delayed signal Vdly1 rises, and the delayed signal Vdly2 and the control signal HYS fall. Since the delayed signal Vdly1 rises when the Q output signal Vdff1Q is at the H level, the frequency selection signal SEL is maintained at the H level. Since the control signal HYS becomes the L level, the comparator output signal S33A changes from the H level to the L level. Accordingly, the monitoring signal COMP changes from the H level to the L level. The AND signal Vand1 which is the logical product of the monitoring signal COMP and the delayed signal Vdly2 also changes from the H level to the L level. At this time, the DFF 41A maintains the Q output signal Vdff1Q at the H level of the previous state.

After time T46, the inductor potential Lout starts to oscillate by resonance. However, since the control signal HYS is at the L level, the comparator output signal S33A is maintained at the L level even when the inductor potential Lout becomes lower than the output potential Vout.

The operation at time T47 is the same as that at time T43.

As described above, once the reverse current of the current IDS is detected, the frequency selection signal SEL is fixed to the H level. When the reverse current of the current IDS is not detected, that is, the inductor potential Lout does not become lower than the output potential Vout during the L level of the PWM signal PWM, the frequency selection signal SEL returns to the L level. In other words, the frequency selection signal SEL is at the H level in the discontinuous current mode, and is at the L level in the continuous current mode. Therefore, in the discontinuous current mode, the carrier signal VRAMP is fixed to the low frequency.

Figure 10:
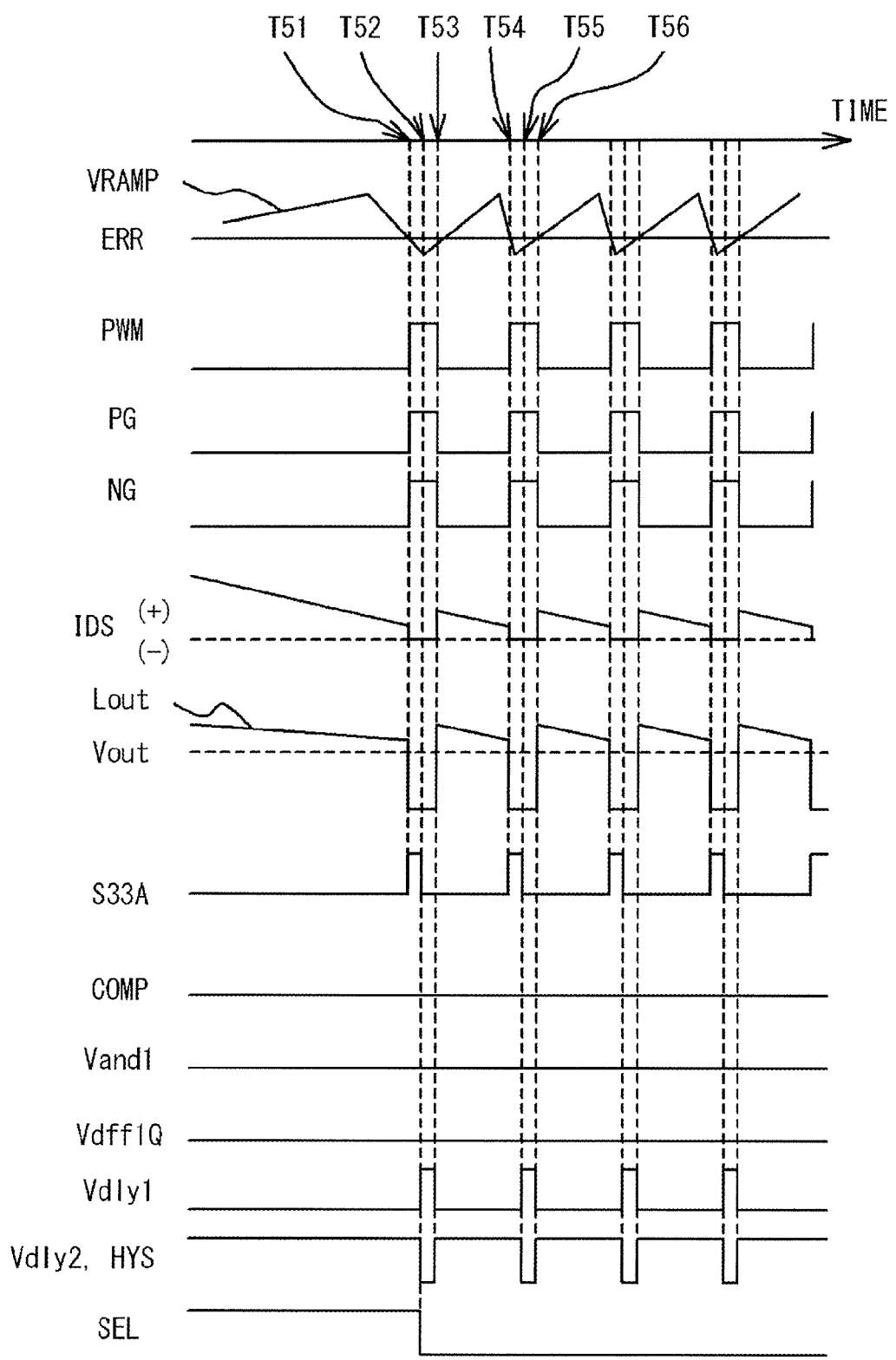
FIG. 10 is a timing chart showing operation waveforms of the step-up switching regulator according to the third embodiment when the operating condition has changed from the discontinuous current mode to the continuous current mode.

The control method when the operating condition of the step-up switching regulator 101A has changed from the discontinuous current mode to the continuous current mode will be described with reference to FIG. 10.

Before time T51, the operating condition of the step-up switching regulator 101A is the discontinuous current mode.

The frequency selection signal SEL is at the H level. Therefore, the frequency of the carrier signal VRAMP is low. The potential of the carrier signal VRAMP is higher than the potential of the error signal ERR. The PWM signal PWM is at the L level. The P-channel gate potential PG is at the L level, and the P-channel transistor 21A is turned on. The N-channel gate potential NG is at the L level, and the N-channel transistor 22A is turned off. The direction of the current IDS is the normal direction. The inductor potential Lout is higher than the output potential Vout. The comparator output signal S33A is at the L level. The monitoring signal COMP is at the L level. The AND signal Vand1 is at the L level. The Q output signal Vdff1Q is at the L level. The delayed signal Vdly1 is at the L level. The delayed signal Vdly2 and the control signal HYS are at the H level.

At time T51, the carrier signal VRAMP changes from the higher potential than the error signal ERR to the lower potential, and the PWM signal PWM changes from the L level to the H level. This corresponds to the case where the inductor potential Lout does not become lower than the output potential Vout and the reverse current of the current IDS does not occur between time T44 and time T47. Accordingly, the N-channel gate potential NG changes from the L level to the H level, which turns on the N-channel transistor 22A. Since the N-channel transistor 22A is turned on, the inductor potential Lout becomes equal to the ground potential. That is, the inductor potential Lout becomes lower than the output potential Vout. Further, since the PWM signal PWM changes from the L level to the H level, the P-channel gate potential PG which is the logical sum of the PWM signal PWM and the Q output signal Vdff1Q changes from the L level to the H level, and the P-channel transistor 21A is turned off. Since the P-channel transistor 21A is turned off, the current IDS flowing through the P-channel transistor 21A is shut off. The hysteresis comparator 33A detects that the inductor potential Lout becomes lower than the output potential Vout, and changes the comparator output signal S33A from the L level to the H level. However, the monitoring signal COMP is maintained at the L level by the inverter 34A and the AND circuit 35A. That is, the inverter 34A and the AND circuit 35A maintain the monitoring signal COMP at the L level even when the comparator output signal S33A becomes the H level when the N-channel transistor 22A is on, thereby preventing the monitoring signal COMP from becoming the H level when the reverse current of the current IDS does not occur. Since the monitoring signal COMP is maintained at the L level, the AND signal Vand1 is also maintained at the L level. Further, since the PWM signal PWM changes from the L level to the H level, the DFF 41A is reset, while the Q output signal Vdff1Q is maintained at the L level.

At time T52 after a lapse of the predetermined time from time T51, the delayed signal Vdly1 rises from the L level to the H level, and the delayed signal Vdly2 and the control signal HYS fall from the H level to the L level. That is, after a delay of the predetermined time from the rising edge of the P-channel gate potential PG, the delayed signal Vdly1 rises, and the delayed signal Vdly2 and the control signal HYS fall. Since the delayed signal Vdly1 rises when the Q output signal Vdff1Q is at the L level, the frequency selection signal SEL changes from the H level to the L level. Accordingly, the frequency of the carrier signal VRAMP becomes high. Since the control signal HYS becomes the L level, the comparator output signal S33A changes from the H level to the L level. The monitoring signal COMP and the AND signal Vand1 are maintained at the L level. At this time, the DFF 41A maintains the Q output signal Vdff1Q at the L level.

At time T53, the carrier signal VRAMP changes from the lower potential than the error signal ERR to the higher potential, and the PWM signal PWM changes from the H level to the L level. Accordingly, the N-channel gate potential NG changes from the H level to the L level, which turns off the N-channel transistor 22A. Since the PWM signal PWM changes from the H level to the L level, the P-channel gate potential PG which is the logical sum of the PWM signal PWM and the Q output signal Vdff1Q changes from the H level to the L level. Accordingly, the P-channel transistor 21A is turned on. Since the N-channel transistor 22A is turned off and the P-channel transistor 21A is turned on, the current IDS flows through the P-channel transistor 21A in the normal direction, and the inductor potential Lout becomes higher than the output potential Vout. Since the P-channel gate potential PG falls from the H level to the L level, the delayed signal Vdly1 falls from the H level to the L level without delay, and the delayed signal Vdly2 and the control signal HYS rise from the L level to the H level without delay. Since the delayed signal Vdly1 falls from the H level to the L level, the frequency selection signal SEL is maintained at the L level of the previous state.

At time T54, the carrier signal VRAMP changes from the higher potential than the error signal ERR to the lower potential, and the PWM signal PWM changes from the L level to the H level. Accordingly, the N-channel gate potential NG changes from the L level to the H level, which turns on the N-channel transistor 22A. Since the N-channel transistor 22A is turned on, the inductor potential Lout becomes equal to the ground potential. That is, the inductor potential Lout becomes lower than the output potential Vout. Further, since the PWM signal PWM changes from the L level to the H level, the P-channel gate potential PG which is the logical sum of the PWM signal PWM and the Q output signal Vdff1Q changes from the L level to the H level, and the P-channel transistor 21A is turned off. Since the P-channel transistor 21A is turned off, the current IDS flowing through the P-channel transistor 21A is shut off. The hysteresis comparator 33A detects that the inductor potential Lout becomes lower than the output potential Vout, and changes the comparator output signal S33A from the L level to the H level. However, the monitoring signal COMP is maintained at the L level by the inverter 34A and the AND circuit 35A. Consequently, the AND signal Vand1 is also maintained at the L level. Further, since the PWM signal PWM changes from the L level to the H level, the DFF 41A is reset, while the Q output signal Vdff1Q is maintained at the L level.

At time T55 after a lapse of the predetermined time from time T54, the delayed signal Vdly1 rises from the L level to the H level, and the delayed signal Vdly2 and the control signal HYS fall from the H level to the L level. That is, after a delay of the predetermined time from the rising edge of the P-channel gate potential PG, the delayed signal Vdly1 rises, and the delayed signal Vdly2 and the control signal HYS fall. Since the delayed signal Vdly1 rises when the Q output signal Vdff1Q is at the L level, the frequency selection signal SEL is maintained at the L level. Since the control signal HYS becomes the L level, the comparator output signal S33A changes from the H level to the L level. The monitoring signal COMP and the AND signal Vand1 are maintained at the L level. At this time, the DFF 41A maintains the Q output signal Vdff1Q at the L level.

The operation at time T56 is the same as that at time T53.

In this embodiment, the switching regulator control circuit 61A includes the oscillator 14A, the PWM comparator 15A, and the transistor drive circuit 30A. The oscillator 14A generates the carrier signal VRAMP. The PWM comparator 15A generates the PWM signal PWM based on the carrier signal VRAMP. The transistor drive circuit 30A drives the switching transistor 22A and the synchronous rectification transistor 21A based on the PWM signal PWM. The oscillator 14A switches the frequency of the carrier signal VRAMP based on the direction of the source-drain voltage of the synchronous rectification transistor 21A corresponding to the direction of the current IDS flowing through the synchronous rectification transistor 21A. Therefore, the operating condition of the load is monitored in a direct manner, and a threshold value for distinguishing between light and heavy loads does not change depending on manufacturing variations or use conditions. Therefore, it is possible to stably enhance the efficiency of the step-up switching regulator 101A at light load.

Further, since the hysteresis comparator 33A monitors the direction of the source-drain voltage of the synchronous rectification transistor 21A corresponding to the direction of the current IDS flowing through the synchronous rectification transistor 21A, it is possible to switch the frequency of the carrier signal VRAMP immediately when the reverse current flows through the synchronous rectification transistor 21A.

Further, when the direction of the source-drain voltage of the synchronous rectification transistor 21A becomes a direction in which the reverse current flows through the synchronous rectification transistor 21A in a duration when the switching transistor 22A is off and the synchronous rectification transistor 21A is on, the oscillator 14A switches the frequency of the carrier signal VRAMP from the high frequency to the low frequency. When the direction of the source-drain voltage of the synchronous rectification transistor 21A has never become the direction in which the reverse current flows through the synchronous rectification transistor 21A in the duration when the switching transistor 22A is off and the synchronous rectification transistor 21A is on, the oscillator 14A switches the frequency of the carrier signal VRAMP from the low frequency to the high frequency. By monitoring the direction of the source-drain voltage of the synchronous rectification transistor 21A and fixing the frequency of the carrier signal VRAMP every switching period, it is possible to set an appropriate carrier frequency every switching period.

Further, when the direction of the source-drain voltage of the synchronous rectification transistor 21A becomes the direction in which the reverse current flows through the synchronous rectification transistor 21A in the duration when the switching transistor 22A is off and the synchronous rectification transistor 21A is on, the transistor drive circuit 30A turns off the synchronous rectification transistor 21A. Accordingly, the reverse current of the current IDS is shut off, which prevents the reduction in the efficiency of the step-up switching regulator 101A.

Further, this embodiment is applicable to the multiple-output power supply system that can supply power to a plurality of loads as in the second embodiment.

While the invention made above by the present inventors has been described specifically based on the illustrated embodiments, the present invention is not limited thereto. It is needless to say that various changes and modifications can be made thereto without departing from the spirit and scope of the invention.

What is claimed is:

1. A switching regulator control circuit comprising:
an oscillator for generating a carrier signal;
a first PWM (Pulse Width Modulation) comparator for generating a first PWM signal based on the carrier signal;
a first transistor drive circuit including a first input configured to receive the first PWM signal, the first transistor drive circuit being configured to drive a first switching transistor; and
a second transistor drive circuit including a second input configured to receive the first PWM signal, the second transistor drive circuit being configured to drive a first synchronous rectification transistor,
wherein the second transistor drive circuit includes a first output terminal and a second output terminal, outputs a control signal for driving the first synchronous rectification transistor to the first synchronous rectification transistor from the first output terminal, and outputs a frequency selection signal based on a direction of a source-drain voltage of the first synchronous rectification transistor from the second output terminal, and
wherein the oscillator receives the frequency selection signal outputted from the second output terminal of the second transistor driver circuit, and switches a frequency of the carrier signal based on the frequency selection signal outputted from the second output terminal of the second transistor drive circuit.

2. The switching regulator control circuit according to claim 1,
wherein when the direction of the source-drain voltage of the first synchronous rectification transistor becomes a direction in which a reverse current flows through the first synchronous rectification transistor in a duration when the first switching transistor is off and the first synchronous rectification transistor is on, the oscillator switches the frequency of the carrier signal from a high frequency to a low frequency, and
wherein when the direction of the source-drain voltage of the first synchronous rectification transistor has never become the direction in which the reverse current flows through the first synchronous rectification transistor in the duration when the first switching transistor is off and the first synchronous rectification transistor is on, the oscillator switches the frequency of the carrier signal from the low frequency to the high frequency.

3. The switching regulator control circuit according to claim 2,
wherein a source of the first switching transistor is coupled to a power supply potential,
wherein a drain of the first switching transistor is coupled to a drain of the first synchronous rectification transistor and one terminal of an inductor,
wherein a source of the first synchronous rectification transistor is coupled to a ground potential,
wherein the other terminal of the inductor is coupled to a load and coupled through a smoothing capacitor to the ground potential, and
wherein when the direction of the source-drain voltage of the first synchronous rectification transistor becomes the direction in which the reverse current flows through the first synchronous rectification transistor, a potential at the drain of the first synchronous rectification transistor becomes higher than a potential at the source.

4. The switching regulator control circuit according to claim 2, wherein a drain of the first switching transistor is coupled to one terminal of an inductor and a drain of the first synchronous rectification transistor, wherein a source of the first switching transistor is coupled to a ground potential, wherein the other terminal of the inductor is coupled to a power supply potential, wherein a source of the first synchronous rectification transistor is coupled to a load and coupled through a smoothing capacitor to the ground potential, and wherein when the direction of the source-drain voltage of the first synchronous rectification transistor becomes the direction in which the reverse current flows through the first synchronous rectification transistor, a potential at the drain of the first synchronous rectification transistor becomes lower than a potential at the source.

5. The switching regulator control circuit according to claim 4, further comprising a hysteresis comparator, wherein the first drive circuit comprises:
a first AND circuit;
a first D flip-flop;
an OR circuit;
a rise delay circuit;
a second D flip-flop;
a rise delay inverting circuit;
an inverter; and
a second AND circuit, wherein a (+) input terminal of the hysteresis comparator is coupled to the source of the first synchronous rectification transistor, wherein a (−) input terminal of the hysteresis comparator is coupled to the drain of the first synchronous rectification transistor, wherein an output terminal of the hysteresis comparator is coupled to a first input terminal of the second AND circuit, wherein an input terminal of the inverter is coupled to an output terminal of the first PWM comparator, wherein an output terminal of the inverter is coupled to a second input terminal of the second AND circuit, wherein an output terminal of the second AND circuit is coupled to a first input terminal of the first AND circuit, wherein an output terminal of the first AND circuit is coupled to a clock input terminal of the first D flip-flop, wherein a D input terminal of the first D flip-flop is coupled to the power supply potential, wherein a reset input terminal of the first D flip-flop is coupled to the output terminal of the first PWM comparator, wherein a Q output terminal of the first D flip-flop is coupled to a D input terminal of the second D flip-flop and a first input terminal of the OR circuit, wherein a second input terminal of the OR circuit is the first input and is coupled to the output terminal of the first PWM comparator, wherein an output terminal of the OR circuit is coupled to an input terminal of the rise delay circuit, a gate of the first synchronous rectification transistor, and an input terminal of the rise delay inverting circuit, wherein an output terminal of the rise delay circuit is coupled to a clock input terminal of the second D flip-flop, wherein a Q output terminal of the second D flip-flop is coupled to an input terminal of the oscillator, wherein an output terminal of the rise delay inverting circuit is coupled to a second input terminal of the first AND circuit and a control signal input terminal of the hysteresis comparator, wherein when the control signal input terminal is at an L level, the output terminal of the hysteresis comparator is at the L level irrespective of potentials at the (+) input terminal and the (−) input terminal, wherein when the control signal input terminal is at an H level and a potential at the (+) input terminal is higher than a potential at the (−) input terminal, the output terminal of the hysteresis comparator is at the H level, wherein when the control signal input terminal is at the H level and the potential at the (+) input terminal is lower than the potential at the (−) input terminal, the output terminal of the hysteresis comparator is at the L level, wherein when the output terminal of the OR circuit is at the H level, the first synchronous rectification transistor is turned off, wherein when the output terminal of the OR circuit is at the L level, the first synchronous rectification transistor is turned on, wherein when the output terminal of the first PWM comparator is at the H level, the first switching transistor is turned on, wherein when the output terminal of the first PWM comparator is at the L level, the first switching transistor is turned off, wherein when the Q output terminal of the second D flip-flop is at the H level, the frequency of the carrier signal is the low frequency, and wherein when the Q output terminal of the second D flip-flop is at the L level, the frequency of the carrier signal is the high frequency.

6. The switching regulator control circuit according to claim 1, wherein when the direction of the source-drain voltage of the first synchronous rectification transistor becomes a direction in which a reverse current flows through the first synchronous rectification transistor in a duration when the first switching transistor is off and the first synchronous rectification transistor is on, the second transistor drive circuit turns off the first synchronous rectification transistor.

7. The switching regulator control circuit according to claim 1, further comprising:
a second PWM comparator for generating a second PWM signal based on the carrier signal;
a third transistor drive circuit including a third input configured to receive the second PWM signal, the third transistor drive circuit being configured to drive a second switching transistor; and
a fourth transistor drive circuit including a fourth input configured to receive the second PWM signal, the fourth transistor drive circuit being configured to drive a second synchronous rectification transistor.

8. A switching regulator control circuit comprising:
an oscillator for generating a carrier signal;
a first PWM comparator for generating a first PWM signal based on the carrier signal; and
a first transistor drive circuit for driving a first switching transistor and a first synchronous rectification transistor based on the first PWM signal;
a second PWM comparator for generating a second PWM signal based on the carrier signal; and a second transistor drive circuit for driving a second switching transistor and a second synchronous rectification transistor based on the second PWM signal, wherein the oscillator switches a frequency of the carrier signal based on a direction of a source-drain voltage of the first synchronous rectification transistor, wherein the first transistor drive circuit outputs a first frequency selection signal, wherein when the direction of the source-drain voltage of the first synchronous rectification transistor becomes a direction in which a reverse current flows through the first synchronous rectification transistor in a duration when the first switching transistor is off and the first synchronous rectification transistor is on, the first frequency selection signal changes from a first level to a second level, wherein when the direction of the source-drain voltage of the first synchronous rectification transistor has never become the direction in which the reverse current flows through the first synchronous rectification transistor in the duration when the first switching transistor is off and the first synchronous rectification transistor is on, the first frequency selection signal changes from the second level to the first level, wherein the second transistor drive circuit outputs a second frequency selection signal, wherein when the direction of the source-drain voltage of the second synchronous rectification transistor becomes a direction in which a reverse current flows through the second synchronous rectification transistor in a duration when the second switching transistor is off and the second synchronous rectification transistor is on, the second frequency selection signal changes from a third level to a fourth level, wherein when the direction of the source-drain voltage of the second synchronous rectification transistor has never become the direction in which the reverse current flows through the second synchronous rectification transistor in the duration when the second switching transistor is off and the second synchronous rectification transistor is on, the second frequency selection signal changes from the fourth level to the third level, wherein when the first frequency selection signal is at the second level and the second frequency selection signal is at the fourth level, the frequency of the carrier signal is a low frequency, and wherein except when the first frequency selection signal is at the second level and the second frequency selection signal is at the fourth level, the frequency of the carrier signal is a high frequency.

9. A switching regulator control circuit comprising:

an oscillator for generating carrier signal;

a first PWM (Pulse Width Modulation) comparator for generating a first PWM signal based on the carrier signal;

a first transistor drive circuit including a first input configured to receive the first PWM signal, the first transistor drive circuit being configured to drive a first switching transistor; and a second transistor drive circuit including a second input configured to receive the first PWM signal, the second transistor drive circuit being configured to drive a first synchronous rectification transistor, wherein the second transistor drive circuit includes a first output terminal and a second output terminal, outputs a control signal for driving the first synchronous rectification transistor to the first synchronous rectification transistor via the first output terminal, and outputs a frequency selection signal based on a direction of a source-drain voltage of the first synchronous rectification transistor via the second output terminal, the control outputted from the second transistor drive circuit via the first output terminal being different from the frequency selection signal outputted from the second transistor drive circuit via the second output terminal, wherein the oscillator receives the frequency selection signal outputted from the second transistor driver circuit, and switches a frequency of the carrier signal based on the frequency selection signal outputted from the second transistor drive circuit, wherein a source of the first switching transistor is coupled to a power supply potential, wherein a drain of the first switching transistor is coupled to a drain of the first synchronous rectification transistor and one terminal of an inductor, wherein a source of the first synchronous rectification transistor is coupled to a ground potential, wherein the other terminal of the inductor is coupled to a load and coupled through a smoothing capacitor to the ground potential, wherein when the direction of the source-drain voltage of the first synchronous rectification transistor becomes the direction in which the reverse current flows through the first synchronous rectification transistor, a potential at the drain of the first synchronous rectification transistor becomes higher than a potential at the source, wherein the switching regulator control circuit further comprises a hysteresis comparator, wherein the second transistor drive circuit further comprises:
  a first AND circuit;
  a first D flip-flop;
  a second AND circuit;
  a fall delay inverting circuit;
  a second D flip-flop; and
  a fall delay circuit, wherein a (+) input terminal of the hysteresis comparator is coupled to the drain of the first synchronous rectification transistor, wherein a (−) input terminal of the hysteresis comparator is coupled to the source of the first synchronous rectification transistor, wherein an output terminal of the hysteresis comparator is coupled to a first input terminal of the first AND circuit, wherein an output terminal of the first AND circuit is coupled to a clock input terminal of the first D flip-flop, wherein a D input terminal of the first D flip-flop is coupled to the power supply potential, wherein an inversion reset input terminal of the first D flip-flop is coupled to an output terminal of the first PWM comparator, wherein a Q output terminal of the first D flip-flop is coupled to a D input terminal of the second D flip-flop, wherein a QB output terminal of the first D flip-flop is coupled to a first input terminal of the second AND circuit, wherein a second input terminal of the second AND circuit is the second input and is coupled to the output terminal of the first PWM comparator, wherein an output terminal of the second AND circuit is coupled to an input terminal of the fall delay inverting circuit, a gate of the first synchronous rectification transistor, and an input terminal of the fall delay circuit, wherein an output terminal of the fall delay inverting circuit is coupled to a clock input terminal of the second D flip-flop, wherein a Q output terminal of the second D flip-flop is coupled to an input terminal of the oscillator, wherein an output terminal of the fall delay circuit is coupled to a second input terminal of the first AND circuit and a control signal input terminal of the hysteresis comparator, wherein when the control signal input terminal is at an L level, the output terminal of the hysteresis comparator is at the L level irrespective of potentials at the (+) input terminal and the (−) input terminal, wherein when the control signal input terminal is at an H level and a potential at the (+) input terminal is higher than a potential at the (−) input terminal, the output terminal of the hysteresis comparator is at the H level, wherein when the control signal input terminal is at the H level and the potential at the (+) input terminal is lower than the potential at the (−) input terminal, the output terminal of the hysteresis comparator is at the L level, wherein when the output terminal of the second AND circuit is at the H level, the first synchronous rectification transistor is turned on, wherein when the output terminal of the second AND circuit is at the L level, the first synchronous rectification transistor is turned off, wherein when the output terminal of the first PWM comparator is at the H level, the first switching transistor is turned off, wherein when the output terminal of the first PWM comparator is at the L level, the first switching transistor is turned on, wherein when the Q output terminal of the second D flip-flop is at the H level, the frequency of the carrier signal is the low frequency, and wherein when the Q output terminal of the second D flip-flop is at the L level, the frequency of the carrier signal is the high frequency.

10. A switching regulator control method comprising:
generating, by a PWM (Pulse Width Modulation) comparator, a first PWM signal based on a carrier signal;
receiving, by a transistor drive circuit including a first input terminal, a second input terminal, a first output terminal and a second output terminal, the first PWM signal at the first input terminal of the transistor driver circuit and driving, by the transistor drive circuit, a first switching transistor based on the first PWM signal;
receiving, by the transistor drive circuit, the first PWM signal at the second input terminal of the transistor drive circuit;
outputting, by the transistor drive circuit, to a first synchronous rectification transistor, a control signal for driving the first synchronous rectification transistor based on the first PWM signal at the first output terminal of the transistor drive circuit;
outputting, by the transistor drive circuit, a frequency selection signal based on a direction of a source-drain voltage of the first synchronous rectification transistor at the second output terminal of the transistor drive circuit; and
receiving, by an oscillator, the frequency selection signal outputted at the second output terminal of the transistor drive circuit; and switching, by the oscillator, a frequency of the carrier signal based on the frequency selection signal outputted at the second output terminal of the transistor drive circuit.

11. The switching regulator control method according to claim 10, wherein switching the frequency of the carrier signal comprises:
switching the frequency of the carrier signal from a high frequency to a low frequency when the direction of the source-drain voltage of the first synchronous rectification transistor becomes a direction in which a reverse current flows through the first synchronous rectification transistor in a duration when the first switching transistor is off and the first synchronous rectification transistor is on; and
switching the frequency of the carrier signal from the low frequency to the high frequency when the direction of the source-drain voltage of the first synchronous rectification transistor has never become the direction in which the reverse current flows through the first synchronous rectification transistor in the duration when the first switching transistor is off and the first synchronous rectification transistor is on.

12. The switching regulator control method according to claim 11, further comprising:
generating a second PWM signal based on the carrier signal; and
driving a second switching transistor and a second synchronous rectification transistor based on the second PWM signal.

13. The switching regulator control method according to claim 10, further comprising:
turning off the first synchronous rectification transistor when the direction of the source-drain voltage of the first synchronous rectification transistor becomes a direction in which a reverse current flows through the first synchronous rectification transistor in a duration when the first switching transistor is off and the first synchronous rectification transistor is on.

14. A switching regulator control method comprising:
generating, by a PWM (Pulse Width Modulation) comparator, a first PWM signal based on a carrier signal;
receiving, by a transistor drive circuit, the first PWM signal at a first input of the transistor driver circuit and driving, by the transistor drive circuit, a first switching transistor based on the first PWM signal;
receiving, by the transistor drive circuit, the first PWM at a second input of the transistor drive circuit, and driving, the transistor drive circuit, a first synchronous rectification transistor based on the first PWM signal;
outputting, by the transistor drive circuit, a frequency selection signal based on a direction of a source-drain voltage of the first synchronous rectification transistor, and
switching, by an oscillator, a frequency of the carrier signal based on the frequency selection signal outputted from the transistor drive circuit,
wherein the switching the frequency of the carrier signal comprises:
switching the frequency of the carrier signal from a high frequency to a low frequency when the direction of the source-drain voltage of the first synchronous rectification transistor becomes a direction in which a reverse current flows through the first synchronous rectification transistor in a duration when the first switching transistor is off and the first synchronous rectification transistor is on; and
switching the frequency of the carrier signal from the low frequency to the high frequency when the direction of the source-drain voltage of the first synchronous rectification transistor has never become the direction in which the reverse current flows through the first synchronous rectification transistor in the duration when the first switching transistor is off and the first synchronous rectification transistor is on, wherein the switching regulator control method further comprises;

generating a second PWM signal based on the carrier signal; and driving a second switching transistor and a second synchronous rectification transistor based on the second PWM signal, wherein the switching the frequency of the carrier signal comprises:

changing a first frequency selection signal from a first level to a second level when the direction of the source-drain voltage of the first synchronous rectification transistor becomes a direction in which a reverse current flows through the first synchronous rectification transistor in a duration when the first switching transistor is off and the first synchronous rectification transistor is on;

changing the first frequency selection signal from the second level to the first level when the direction of the source-drain voltage of the first synchronous rectification transistor has never become the direction in which the reverse current flows through the first synchronous rectification transistor in the duration when the first switching transistor is off and the first synchronous rectification transistor is on;

changing a second frequency selection signal from a third level to a fourth level when the direction of the source-drain voltage of the second synchronous rectification transistor becomes a direction in which a reverse current flows through the second synchronous rectification transistor in a duration when the second switching transistor is off and the second synchronous rectification transistor is on; and changing the second frequency selection signal from the fourth level to the third level when the direction of the source-drain voltage of the second synchronous rectification transistor has never become the direction in which the reverse current flows through the second synchronous rectification transistor in the duration when the second switching transistor is off and the second synchronous rectification transistor is on, wherein except when the first frequency selection signal is at the second level and the second frequency selection signal is at the fourth level, the frequency of the carrier signal is a low frequency, and wherein except when the first frequency selection signal is at the second level and the second frequency selection signal is at the fourth level, the frequency of the carrier signal is a high frequency.

* * * * *